(12) United States Patent
Shiraishi

(10) Patent No.: US 8,400,689 B2
(45) Date of Patent: Mar. 19, 2013

(54) IMAGE READING APPARATUS

(75) Inventor: Mitsuo Shiraishi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 12/828,142

(22) Filed: Jun. 30, 2010

(65) Prior Publication Data

US 2011/0007369 A1 Jan. 13, 2011

(30) Foreign Application Priority Data

Jul. 10, 2009 (JP) .................................. 2009-164108

(51) Int. Cl.
*H04N 1/04* (2006.01)
*H04N 1/46* (2006.01)

(52) U.S. Cl. .......................... 358/483; 358/474; 358/509

(58) Field of Classification Search ........................ None
See application file for complete search history.

(56) References Cited

U.S. PATENT DOCUMENTS 6,606,172 B1 8/2003 Moro ............................. 358/483
7,042,591 B1 5/2006 Yamazaki et al. ............. 358/1.5

FOREIGN PATENT DOCUMENTS

JP 11-215298 8/1999
JP 11-261760 9/1999

*Primary Examiner* — Thierry Pham

(74) *Attorney, Agent, or Firm* — Fitzpatrick, Cella, Harper & Scinto

(57) ABSTRACT

This invention provides an image reading apparatus which can start image processing on a joint portion between divided first and second half portions without waiting for image reading and shorten throughput time of image processing by outputting data from the joint portion as first data to an output unit. This apparatus includes a CCD sensor or CMOS sensor in which a plurality of pixel sensors to receive reflected light from a document are arranged in the main scanning direction and a transfer circuit configured to output, to an output unit, optical image information read at the first and second half portions of the pixel sensors in the main scanning direction. The transfer circuit outputs, to the output unit, data from the joint portion between the first and second half portions of the pixel sensors in the main scanning direction as the first data.

5 Claims, 23 Drawing Sheets

FIG. 7
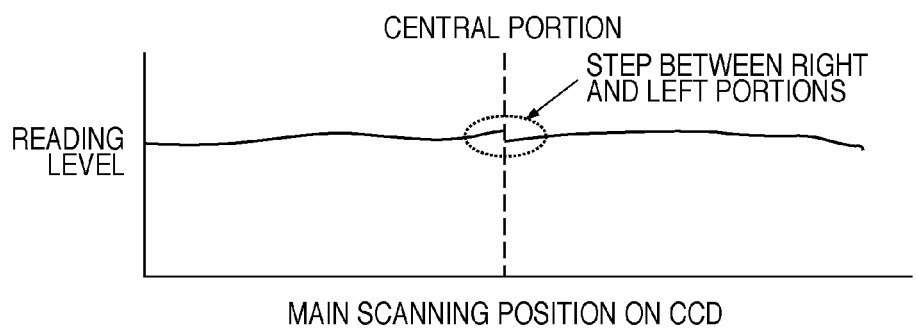
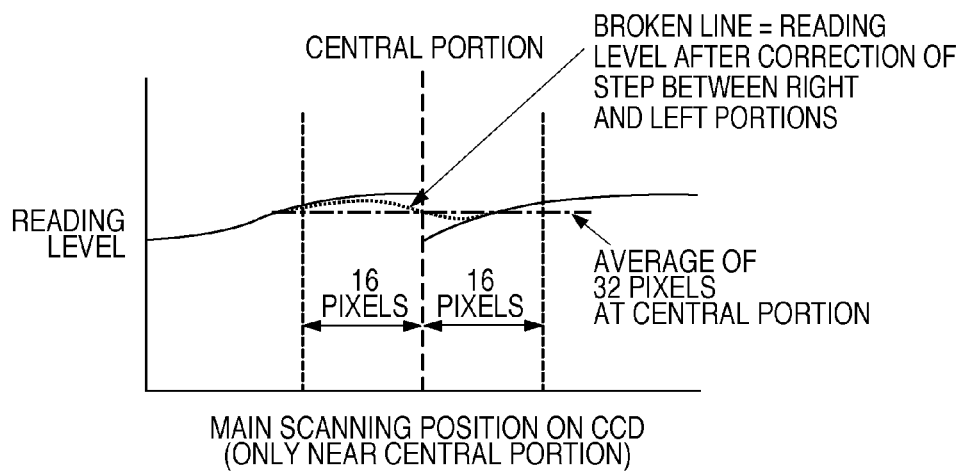

FIG. 16B

```
S201 — START OF READING
  ↓
S202 — DETECT WIDTH OF DOCUMENT SHEET IN MAIN SCANNING DIRECTION
  ↓
S203-2 — SET DRIVING SIGNAL CORRESPONDING TO DOCUMENT WIDTH IN CMOS DRIVING SIGNAL GENERATION UNIT
  ↓
S204-2 — TRANSMIT READ PIXEL SET VALUE FROM CMOS DRIVING SIGNAL GENERATION UNIT TO CMOS PROGRAMMABLE SHIFT REGISTER
  ↓
S205 — DETECT SIZE OF DOCUMENT SHEET IN SUB-SCANNING DIRECTION
  ↓
S206 — SET NUMBER OF READING LINES IN SUB-SCANNING DIRECTION
  ↓
S207 — START OUTPUTTING DRIVING SIGNAL
  ↓
S208 — START SUB-SCANNING LINE COUNTER
  ↓
S209 — COUNT UP FOR EACH SUB-SCANNING LINE
  ↓
S210 — DOES SUB-SCANNING COUNTER VALUE COINCIDE WITH NUMBER OF READING LINES?
  NO → back to S209
  YES ↓
S211 — STOP SUB-SCANNING LINE COUNTER
  ↓
S212 — STOP OUTPUTTING DRIVING SIGNAL
  ↓
S213 — END OF READING
```

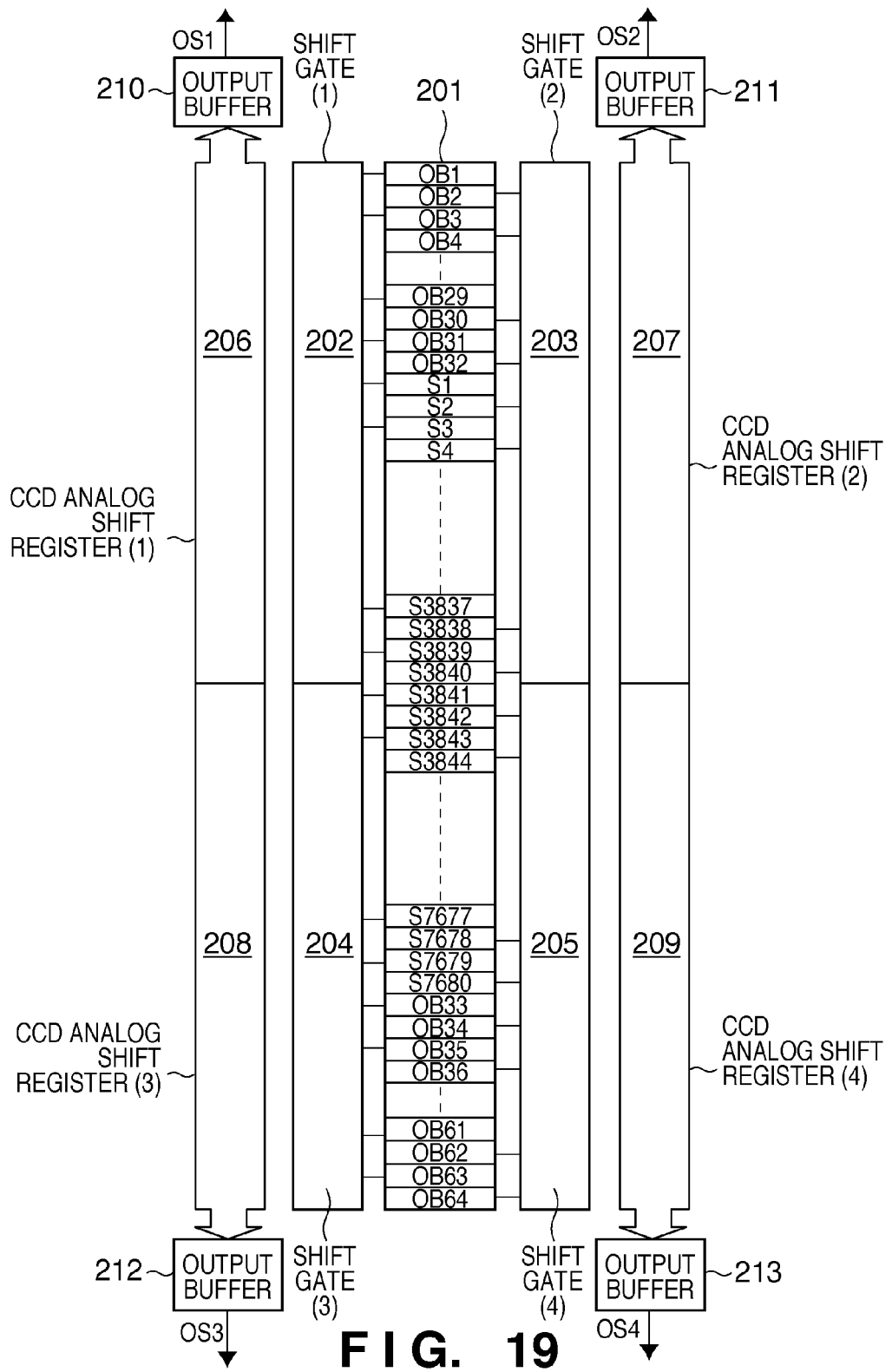
F I G. 19

IMAGE READING APPARATUS

BACKGROUND OF THE INVENTION

1. Field of the Invention

The present invention relates to an image reading apparatus and, more particularly, to an image reading apparatus which uses photoelectric conversion elements, as image reading elements, of a type divided into the first half portion and the second half portion in the main scanning direction.

2. Description of the Related Art

Conventionally, standalone image scanners and the image reading apparatuses mounted in digital copying machines and the like use CCD linear image sensors and CMOS linear image sensors. For the sake of high read rates, these image sensors use a technique called the ODD/EVEN output method which alternately allots outputs according to odd-numbered/even-numbered pixels or a method of dividing outputs into the first half portion and the second half portion in the main scanning direction (see Japanese Patent Laid-Open No. 11-261760). There has also been proposed an image sensor which can implement double rate reading of an ODD/EVEN 2-channel output image sensor (see Japanese Patent Laid-Open No. 11-215298). Such a sensor performs 4-channel output operation by combining ODD/EVEN method and the method of dividing outputs into the first half portion and the second half portion.

A conventional CCD will be described below. FIG. 19 shows the arrangement of the conventional CCD sensor. Reference numeral 201 denotes the photoelectric conversion element of the CCD sensor, i.e., a photo-detector (to be referred to as PD hereinafter) unit constituted by PDs. OB pixels OB1 to OB64 on which light-shielding films are formed to block light and are designed to detect the reading levels of the PDs at a dark time are arranged on the two end portions of the PD unit 201 such that the 32 pixels are arranged on each of the right and left end portions. PDs S1 to S7680 located inside the positions of the OB pixels are PDs for reading light reflected by a document. The PD unit 201 is divided into right and left portions at the central portion between the PDs S3840 and S3841. A shift gate (1) 202, a shift gate (2) 203, a shift gate (3) 204, and a shift gate (4) 205 are circuits to transfer the charges generated in the respective PD elements upon photoelectric conversion in the PD unit 201 to a CCD shift register unit as a charge transfer element. The shift gate (1) 202 transfers charges in the right odd-numbered (ODD) portion of the PD unit 201 to a CCD analog shift register (1) 206. The shift gate (2) 203 transfers charges in the right even-numbered (EVEN) portion of the PD unit 201 to a CCD analog shift register (2) 207. The shift gate (3) 204 transfers charges in the left odd-numbered (ODD) portion of the PD unit 201 to a CCD analog shift register (3) 208. The shift gate (4) 205 transfers charges in the left even-numbered (EVEN) portion of the PD unit 201 to a CCD analog shift register (4) 209. The respective CCD analog shift registers send the received charges to output buffers 210 to 213 pixel by pixel by the charge transfer scheme while sequentially shifting the charges to adjacent pixels. The amplifier circuits in the output buffers convert the charges in the respective pixels, which are sent to the output buffers by the charge transfer scheme, into desired voltages and output them as OS1, OS2, OS3, and OS4.

FIG. 20 shows the state of a conventional image data rearrangement. FIG. 20 shows an arrangement order 905 of image data DS1 to DS4 output from CCD analog shift registers 901 to 904. In this manner, the image data are sequentially rearranged from the end portions (S1 and S2, and S7670 and S7680) of the PD unit 201 toward the central portion. Finally, the rearrangement at the central portion ends. After the rearrangement is complete in this manner, the charges pass through a shading correction circuit 804 described above and a 10 bit→8 bit conversion circuit 805. As shown in FIG. 20, only an effective pixel area is extracted from the charges by the main scanning valid pixel signal generated by a reading control IC 702 to output a Video_OUT signal. That is, in the arrangement of a conventional CCD sensor, the CCD analog shift register units sequentially transfer charges from the OB pixels located at the outermost portions to the output buffers. Finally, the data of the pixels located at the central portion (S3839 for OS1, S3840 for OS2, S3841 for OS3, and S3842 for OS4) are output.

FIG. 21 is a timing chart showing image data output control by a conventional CCD sensor. A Low interval of a light receiving time control signal is a time during which the PD unit 201 on one main scanning line is receiving light. A Hi interval of this signal is a time during which the charges generated in the PD unit is transferred to the shift register unit by gate shifting. A charge transfer time is a time during which the CCD analog shift register unit transfers one-line charges. In addition, "Video Output Signal" represents the timing at which a Video output is output after image processing. As shown in FIG. 21, the conventional technique is characterized in that since the entire effective image area is not read unless a charge transfer time elapses, the output timing of a Video output signal is after the end of charge transfer.

FIG. 22 shows the image processing blocks of an image processing unit 2505 in a conventional CCD sensor. This arrangement is the same as that of an image processing unit 705 according to an embodiment (to be described in detail with reference to FIG. 5) except that a rearrangement unit 803 of the conventional image processing unit includes a line memory 807. This is because, since image data cannot be supplied to the subsequent image processing block until the rearrangement of the image data is complete for the correction of the step between the right and left portions, it is necessary to temporarily store the data in the memory.

A conventional CCD linear image sensor of a type divided into the first half portion and the second half portion, however, needs to output signals by sequentially transferring signal charges from the pixels on the right and left end portions in the main scanning direction to an output buffer because of the structural problem of the CCD in terms of the transfer of signal charges. Dividing the CCD into the first half portion and the second half portion will shorten the transfer time from the CCD to half. However, image data at a portion corresponding to the joint portion at the central portion are transferred last. Assume that it is necessary to perform image processing such as correcting variations in the right and left CCD device portions on the joint portion at the central portion and filtering a plurality of pixels including pixels on the join portion. In this case, it is impossible to perform image transfer to the next image processing unit before the end of processing on the joint portion. The CCD which is divided into two portions outputs signals by sequentially transferring signal charges from the pixels on the right and left end portions in the main scanning direction to the output buffer. This CCD outputs data by signal charges from the outermost portions which are not an effective image, and hence it is always necessary to read all image signals. That is, even when reading a small image projected on the central portion of the CCD, it is always necessary to read all pixels. This makes it impossible to change the read time in accordance with the document size.

SUMMARY OF THE INVENTION

The present invention provides an image reading apparatus which can start image processing on the joint portion between the divided first and second half portions without waiting for image reading and shortens the throughput time for images by outputting each pixel on the joint portion as a start pixel to an output unit.

In order to solve the above problem, an image reading apparatus according to the present invention comprises: a photoelectric conversion element in which a plurality of pixel sensors receiving reflected light from a document are arranged in a main scanning direction; and a transfer circuit configured to output image information output from the photoelectric conversion element to an output unit, the transfer circuit having transfer channels which transfer the image information output from a first half portion and a second half portion of the photoelectric conversion element in the main scanning direction, respectively. Further, the transfer circuit outputs, to the output unit, a pixel adjacent to a joint portion between the first half portion and the second half portion of the photoelectric conversion element in the main scanning direction as a start pixel.

According to the present invention, since the photoelectric conversion element is divided into the first half portion and the second half portion in the main scanning direction, and a pixel on the joint portion between the divided first and second half portions is output as a start pixel to the output unit, it is possible to correct first the luminance difference between the right and left portions which is caused by the different characteristic between the right and left reading device portions which occurs on the joint portion. This makes it possible to start image processing at the joint portion without waiting for image reading operation, thus shortening the throughput time for images. In addition, this apparatus includes, on the right and left end portions, the shading pixel portions which receive no optical image information as reflected light from a document, and causes the transfer circuit to output data from a first pixel to the output unit upon adding data from a shading pixel portion. This makes it possible to correct the characteristic difference between the right and left reading device portions at the joint portion by comparing with images from the shading pixel portion. It is therefore possible to implement proper correction of the right and left reading levels without any influence of read images.

In addition, the document center position in the main scanning direction of an auto document feeder which automatically conveys a document to the image position of the image reading unit is made to optically almost coincide with the joint portion position between the first half portion and the second half portion in the main scanning direction of the photoelectric conversion element. This can make the numbers of read pixels on the right and left portions from the joint portion almost equal to each other in accordance with the width of a document stacked on the auto document feeder. It is therefore possible to change the number of pixels read by the photoelectric conversion element in accordance with the width of a document stacked on the auto document feeder. That is, when a document with a small width is stacked on the auto document feeder and an image is to be read from the document, since the number of read pixels in the main scanning direction can be decreased in accordance with the width of the document (the required time can be shortened), it is possible to transfer image data to the next image processing unit by reading only a necessary image without reading the entire image. This makes it possible to optimize the image read time in accordance with the document size, which is impossible to implement with a conventional CCD linear sensor required to read an entire image. It is therefore possible to improve the read throughput of documents with small sizes in the main scanning direction.

Further features of the present invention will become apparent from the following description of exemplary embodiments with reference to the attached drawings.

BRIEF DESCRIPTION OF THE DRAWINGS

FIG. 7 shows an example 7a of the step between right and left portions which occurs even after the gain correction of the average values of the right and left CCD characteristics indicated by 6c in FIG. 6, and an example 7b view expressing the step between the right and left portions indicated by 7a in the form of a graph;

FIG. 16B is a flowchart showing an example of a sequence of reading one document page in the second embodiment;

FIG. 19 is a block diagram showing an example of a conventional CCD sensor;

DESCRIPTION OF THE EMBODIMENTS

The embodiments of the present invention will be described in detail below with reference to the accompanying drawings.

<Example of Arrangement of Image Reading Unit of Image Reading Apparatus of Embodiment>

Figure 1:
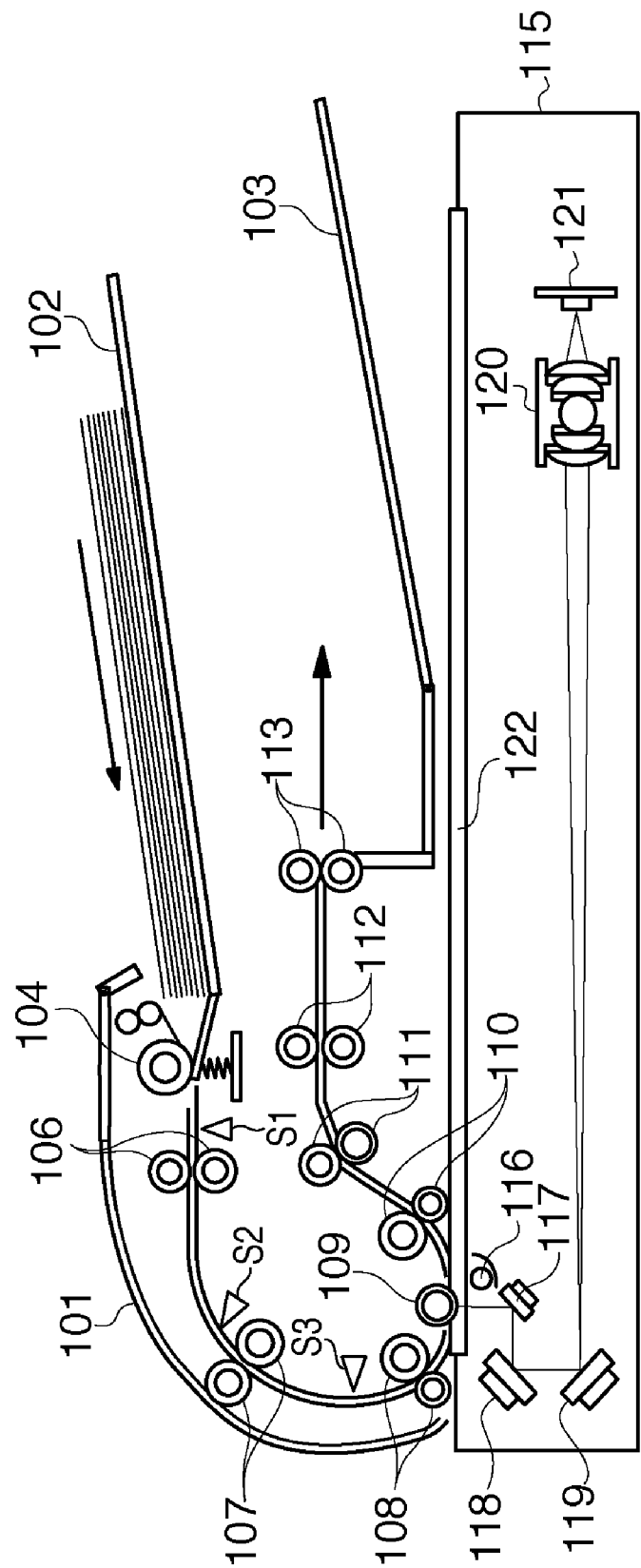
FIG. 1 is a view showing an example of the arrangement of an image reading apparatus according to an embodiment.

FIG. 1 is a view showing an example of the arrangement of the image reading unit and auto document feeder of a document reading apparatus for reading documents according to an embodiment of the present invention. Note that the document reading apparatus of this embodiment can be singly used as a scanner or applied to a multi-functional peripheral in combination with a printer and a facsimile apparatus or multi-functional peripheral in combination with a communication function. Note that the image reading apparatus of this embodiment is configured to process the image read by the image reading unit in FIG. 1 using the image processing unit shown in FIGS. 2 to 5 and output the image data to an external apparatus.

The image reading unit in FIG. 1 includes the following constituent elements. The image reading unit includes a photoelectric conversion element 121 such as a CCD or CMOS, a lens 120 for focusing light from a document table onto the photoelectric conversion element 121, and a light source 116 which irradiates a document on the document table with light. The image reading unit also includes reversion mirrors 117, 118, and 119 for guiding reflected light from a document to the photoelectric conversion element, an optical unit (not shown) for supporting the light source 116 and the reversion mirrors 117, 118, and 119, and a glass 122 on which a document is placed. The image reading unit further includes a frame 115 which supports these constituent elements. The image reading unit has the following two reading modes. One is the document fixed reading mode of reading an image by making the optical unit move along a document placed on the document table glass 122. The other is the document sheet fed scanning mode of reading an image on a document by feeding the document from the auto document feeder (to be described next) without moving the optical unit.

The auto document feeder which automatically conveys a document to an image reading position in FIG. 1 will be described next. First of all, an auto document feeder 101 feeds documents from a document feed tray 102 using a document pickup roller 104 while separating the documents one by one. Rollers 106, 107, and 108 feed a document to a roller 109 at the image reading position. A surface image of the document reflects light from the light source 116 of the optical unit for reading surface images which has moved to a position to face the roller 109. The reversion mirrors 117, 118, and 119 then reflect the reflected light to guide the reflected light to the photoelectric conversion element 121 through the imaging lens 120. The photoelectric conversion element 121 then reads the image. The document reaches a document discharge tray 103 through rollers 110 and rollers 111, 112, and 113. A document detection sensor S1 for detecting a document sheet is provided between the document pickup roller 104 and the rollers 106. The document detection sensor S1 detects the leading and trailing edges of a document sheet fed from the document feed tray 102. A document detection sensor S2 is provided between the rollers 106 and the rollers 107. A document detection sensor S3 is also provided between the rollers 107 and the rollers 108. The document detection sensors S2 and S3 each detect the leading and trailing edges of the document sheet conveyed by the auto document feeder in the convey direction. This can detect the presence/absence of a document sheet at the roller 109, i.e., the image reading position, and decide the emission timing of the light source 116 and the image reading timing of the photoelectric conversion element 121.

First Embodiment

An example of the arrangement of the first embodiment and an example of the operation of the embodiment in a case in which the image reading apparatus of the present invention is implemented by a CCD sensor will be described below.

<Example of Arrangement of CCD Sensor of First Embodiment>

Figure 2:
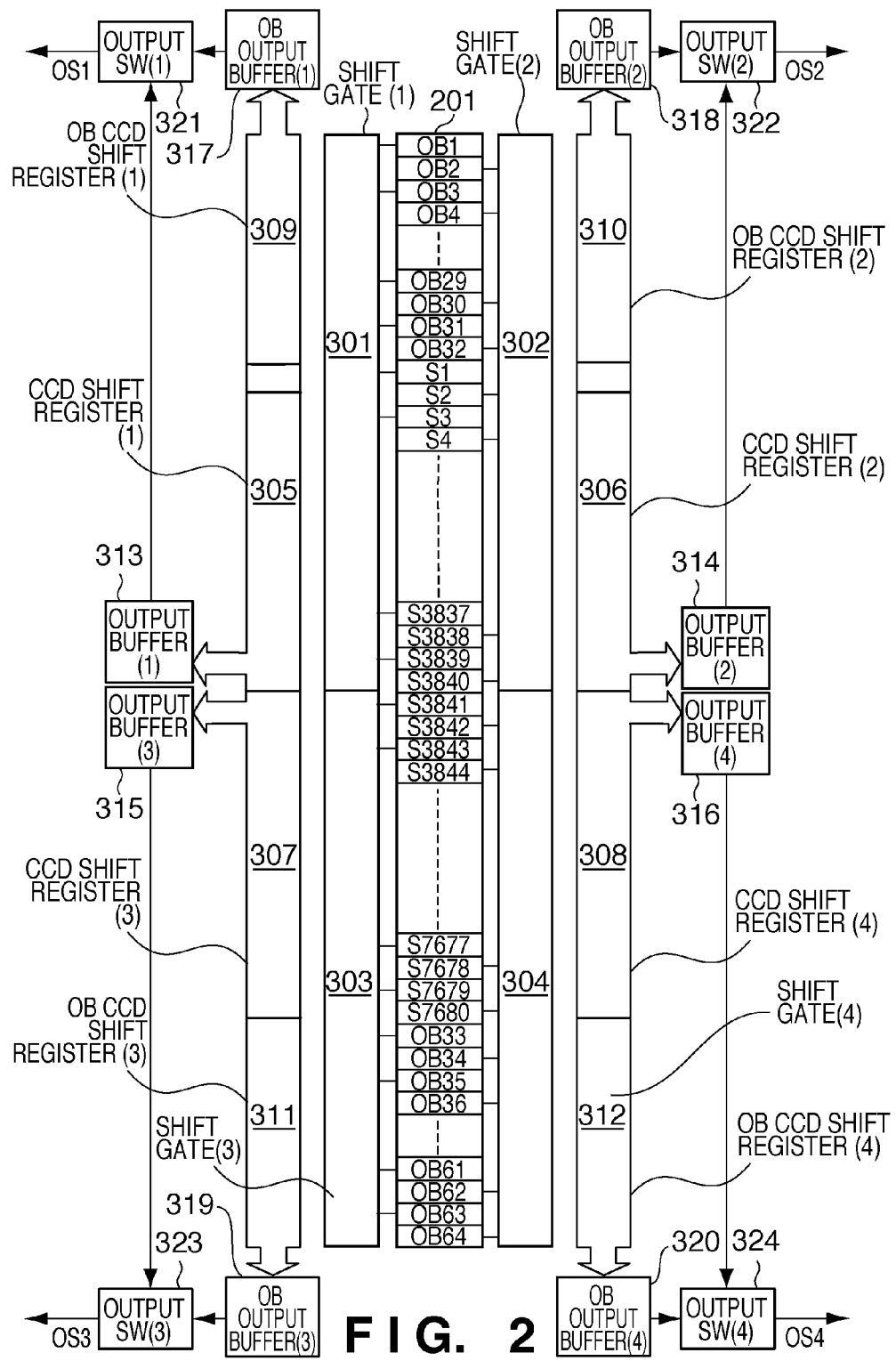
FIG. 2 is a view showing an example of a CCD sensor according to the first embodiment.

FIG. 2 shows an example of the arrangement of a CCD sensor according to this embodiment, i.e., the photoelectric conversion element 121 in FIG. 1. Reference numeral 201 denotes a photoelectric conversion element in which a plurality of CCD sensors which are pixel sensors are arranged. That is, this is a photo-detector (to be referred to as PD hereinafter) unit including PDs. PDs on which light-shielding films are formed to block light are arranged on the two end portions of the PD unit 201 so as to be arranged on each of the right and left end portions in correspondence with 32 OB pixels (OB1 to OB64) configured to detect reading levels at a dark time. These pixel portions will be referred to as shading pixel portions. PDs S1 to S7680 located inside the positions of the PDs for the OB pixels are PDs for reading light reflected by a document sheet as optical image information. The PD unit 201 is divided into the first half portion and the second half portion in the main scanning direction at the central portion between S3840 and S3841. Pieces of optical image information in the first half portion and the second half portion in the main scanning direction are respectively transferred through transfer channels to be output as 2-channel image data to output units. The overall circuit (to be described later) which transfers optical image information from the PD unit 201 will be referred to as a transfer circuit.

A shift gate (1) 301, a shift gate (2) 302, a shift gate (3) 303, and a shift gate (4) 304 are circuits to transfer the charges generated in the respective PD elements upon photoelectric conversion in the PD unit 201 to CCD shift register units as charge transfer elements. The shift gate (1) 301 transfers charges in image areas S1 to S3839 of the right odd-numbered (ODD) portion of the PD unit 201 to a CCD shift register (1) 305, and transfers charges in the OB pixels to an OB CCD shift register (1) 309. The shift gate (2) 302 transfers charges in image areas S2 to S3840 of the right even-numbered (EVEN) portion of the PD unit 201 to a CCD shift register (2) 306, and transfers charges in the OB pixels to an OB CCD shift register (2) 310. The shift gate (3) 303 transfers charges in image areas S3841 to S7679 of the left odd-numbered (ODD) portion of the PD unit 201 to a CCD shift register (3) 307, and transfers charges in the OB pixels to an OB CCD shift register (3) 311. The shift gate (4) 304 transfers charges in image areas S3842 to S7680 of the left even-numbered (EVEN) portion of the PD unit 201 to a CCD shift register (4) 308, and transfers charges in the OB pixels to an OB CCD shift register (4) 312. The CCD shift registers and OB CCD shift registers send the received charges to output buffers 313, 314, 315, and 316 and OB output buffer units 317, 318, 319, and 320 pixel by pixel by the charge transfer scheme while sequentially shifting the charges to adjacent pixels. Amplifier circuits in the output buffers convert the charges in the respective elements, which are sent to the output buffers by the charge transfer scheme, into desired voltages and output them to next output SWs. Output SWs 321, 322, 323, and 324 are output switches which are provided to switch between outputting outputs from read pixels from the output buffers 313, 314, 315, and 316 and outputting outputs from the OB output buffers 317, 318, 319, and 320. In this manner, the signals obtained by reading the charges generated by the PD unit 201 upon reception of light are output as output signals OS1, OS2, OS3, and OS4.

Note that a characteristic of this embodiment in FIG. 2 is that the CCD shift register units 313, 314, 315, and 316 output charges in pixels on the central portion first instead of OB pixels on the end portions. That is, a CCD shift register (1) 313 can output charges from S3839 as the start pixel. A CCD shift register (2) 314 can output charges from S3840 as the start pixel. A CCD shift register (3) 315 can output charges from S3841 as the start pixel. A CCD shift register (4) 316 can output charges from S3842 as the start pixel.

<Example of Flow of Image Signal in CCD Sensor of First Embodiment>

Figure 3:
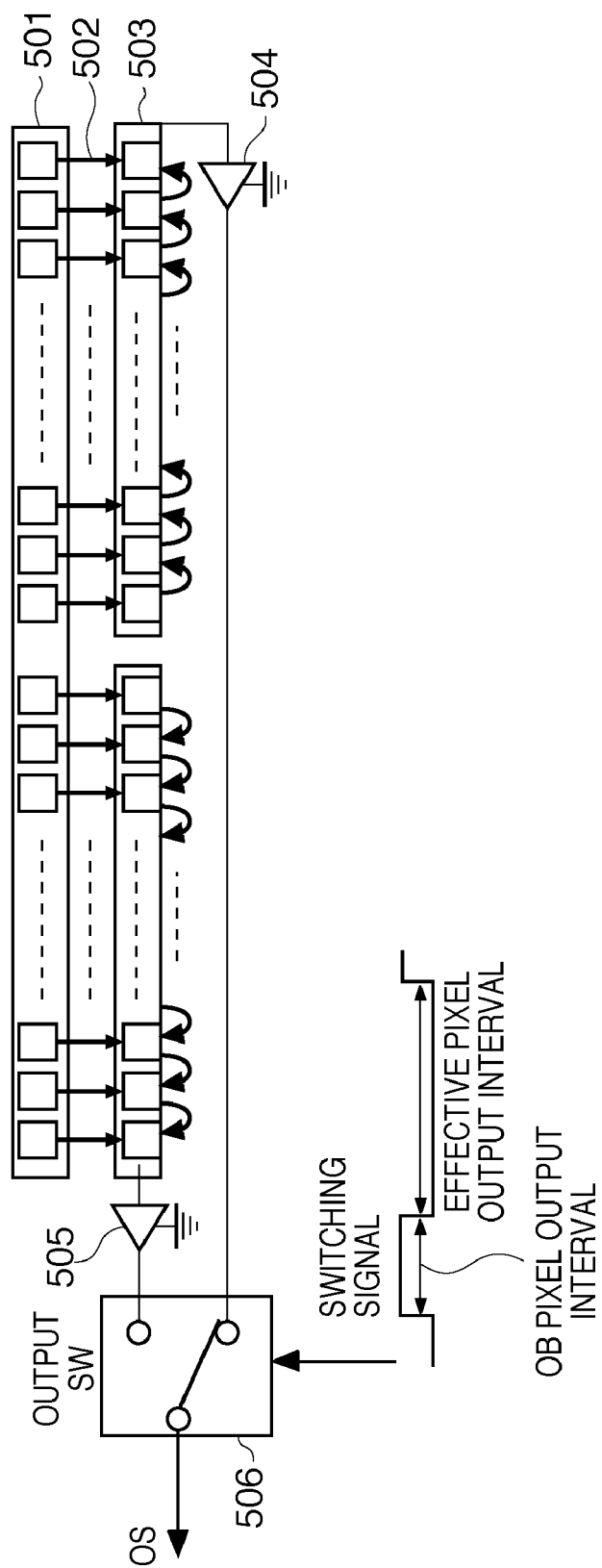
FIG. 3 is a simplified view of the structure of the CCD sensor according to the first embodiment.

FIG. 3 is a simplified view of the flow of an image signal in the arrangement in FIG. 2. A PD unit 501 in FIG. 3 corresponds to the PD unit 201 in FIG. 2. A shift gate unit 502 transfers the charges generated by the PD unit 501 to a next CCD shift register unit 503, as indicated by the arrows. The CCD shift register unit 503 outputs the charges received from the respective elements to output buffer units 504 and 505 by transferring the charges to adjacent pixels pixel by pixel. The output buffer units 504 and 505 convert the received charges into predetermined voltages and transfer them to an output SW unit 506. The output SW unit 506 is provided with a switch to switch and output signals from the output buffer units 504 and 505.

<Example of Image Data Processing in CCD Sensor of First Embodiment>

Figure 4:
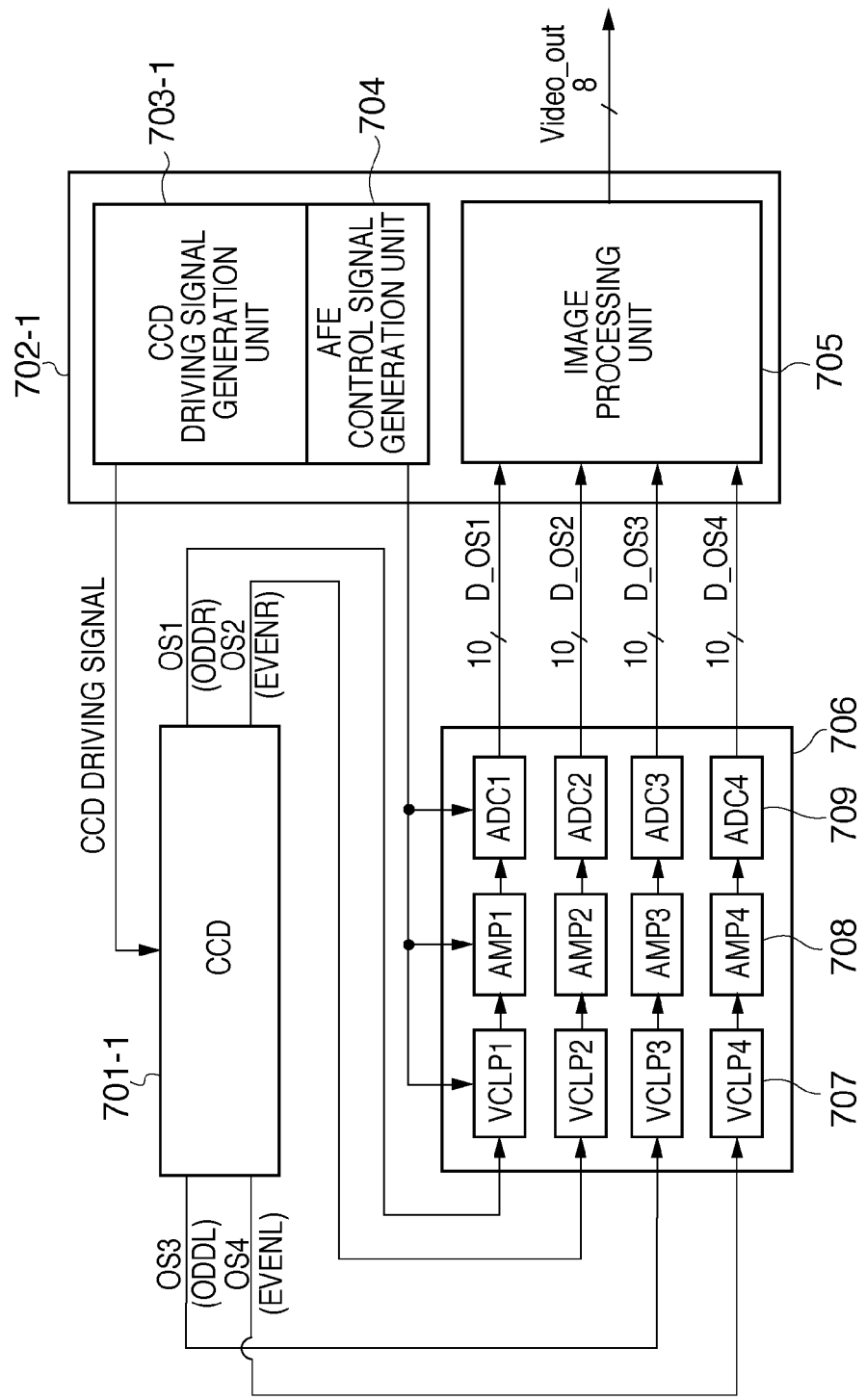
FIG. 4 is a block diagram showing an example of processing of the image signal output from the CCD sensor according to the first embodiment.

FIG. 4 is a block diagram showing an example of a processing arrangement for image data output from the CCD sensor of this embodiment. A CCD sensor 701-1 of this embodiment is driven by the CCD driving signal generated by a CCD driving signal generation unit 703-1 in a reading control IC 702-1 to output the four output signals OS1, OS2, OS3, and OS4. The output signal OS1 represents the odd-numbered pixels (ODDR) on the right side of the sensor divided at the central portion in the main scanning direction. The output signal OS2 represents the even-numbered pixels (EVENR) on the right side of the sensor divided at the central portion in the main scanning direction. The output signal OS3 represents the odd-numbered pixels (ODDL) on the left side of the sensor divided at the central portion in the main scanning direction. The output signal OS4 represents the even-numbered pixels (EVENL) on the left side of the sensor divided at the central portion in the main scanning direction. An A/D conversion block 706 converts the four output signals OS1, OS2, OS3, and OS4 from analog signals to 10-bit digital signals. In the A/D conversion block 706, first of all, VCLPs 707 clamp the output voltages of the output signals OS1, OS2, OS3, and OS4 in accordance with the timing generated by an AFE (Analog Front End) control signal generation unit 704 in the reading control IC 702-1. AMPs 708 on the subsequent stage amplify the clamped voltages with predetermined gains designated by the AFE control signal generation unit 704, and send the resultant voltages to ADCs (Analog Digital Conversion circuits) 709 on the subsequent stage. The ADCs 709 output digital signals D_OS1, D_OS2, D_OS3, and D_OS4. An image processing unit 705 in the reading control IC 702-1 performs image processing of the output digital signals D_OS1, D_OS2, D_OS3, and D_OS4, and outputs the resultant signals as an 8-bit image signal Video Out.

<Example of Internal Image Processing Blocks in Image Processing Unit of First Embodiment>

Figure 5:
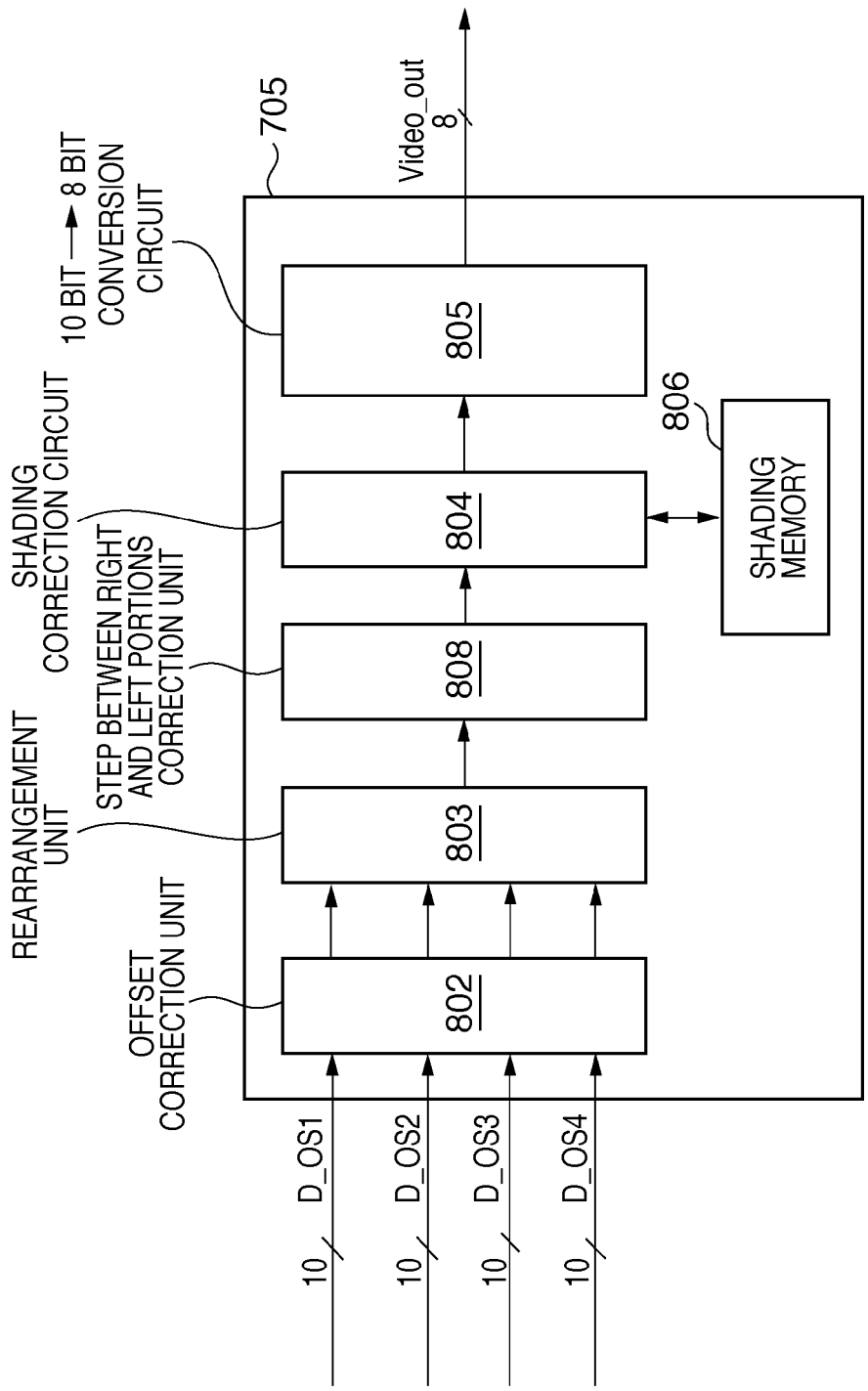
FIG. 5 is a block diagram showing the internal blocks of an image processing unit 705 in FIG. 4.

FIG. 5 shows an example of image processing blocks in the image processing unit 705 of the image data processing blocks in FIG. 4.

(Offset Correction Unit 802)

Figure 6:
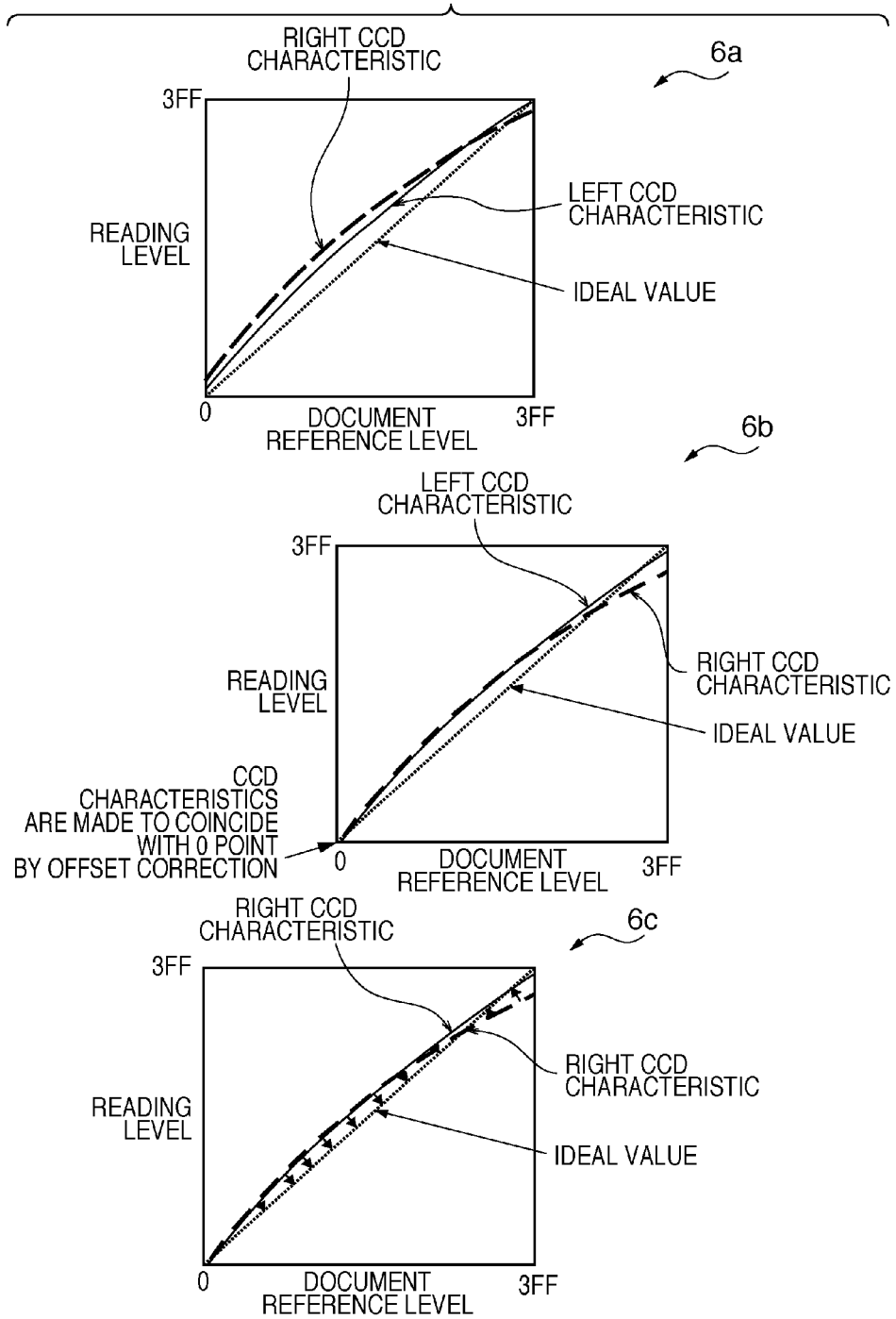
FIG. 6 shows an example 6a of right and left CCD reading characteristics immediately after A/D conversion, an example 6b of CCD reading characteristics after offset correction, and an example 6c of gain correction of the average values of right and left CCD characteristics.

First of all, an offset correction unit 802 performs offset processing of the 10-bit data input from the A/D conversion block 706. More specifically, the offset correction unit 802 reads the levels of the input OB pixels and checks the reading levels at a dark time. As indicated by 6a in FIG. 6, if the image data from the right and left CCD portions differ from each other, the offset correction unit 802 sets the reading levels at a dark time to the zero level as indicated by 6b in FIG. 6, and adds/subtracts a uniform offset value to/from the reading levels regardless of the luminance levels from the document.

(Rearrangement Unit 803)

In order to integrate the four input digital signals D_OS1, D_OS2, D_OS3, and D_OS4 into one image signal, a rearrangement unit 803 rearranges the image.

(Step Between Right and Left Portions Correction Unit 808)

A step between right and left portions correction unit 808 corrects, for the 10-bit image data converted into serial data, the difference between the right and left reading levels which is caused by the step between the right and left portions. First of all, as indicated by 6c in FIG. 6, the right and left reading levels having undergone zero level correction at a dark time after offset correction differ from each other, and exhibit reading characteristics deviating from the ideal value indicated by the dotted line. For this reason, first of all, the step between right and left portions correction unit 808 applies gains corresponding to the document reference levels to the average reading characteristics of the right and left CCD portions to set them to the ideal value. As a consequence, the average values of the right and left CCD reading characteristics coincide with the ideal value. However, this processing alone cannot correct the step of the reading characteristics which occurs at the central portion corresponding to the joint portion between the right and left CCD portions. This is because, as indicated by 7a in FIG. 7, even if the average reading characteristic on the right side coincides with that on the left side, the difference between the reading characteristics which occurs at the joint portion corresponding to the central portion remains. As indicated by 7b in FIG. 7, therefore, the step between right and left portions correction unit 808 obtains the average of the reading levels of 32 pixels at the central portion based on the image data of 16 pixels on each of the right and left portions relative to the central portion. The step between right and left portions correction unit 808 then corrects the gains of the pixels on the right and left sides of the central portion to make the reading level of each pixel corresponding to the joint portion at the central portion coincide with the average of the reading levels of the 32 pixels. The step between right and left portions correction unit 808 corrects the gains in a 16-pixel interval from the central portion in the following manner. If the gain amount for correcting the gain at the central portion to make it coincide with the average is $16/15$, the step between right and left portions correction unit 808 corrects the gain of the adjacent pixel by multiplying it by $15/16$ of the gain amount coinciding with the average. The step between right and left portions correction unit 808 corrects the gain of the adjacent pixel by multiplying it by $14/16$ of the gain amount coinciding with the average. Finally, the step between right and left portions correction unit 808 corrects the gain of the 16th pixel from the central portion by 1/16 of the gain amount coinciding with the average of the 32 pixels. This makes it possible to obtain sharp image data without any sense of discomfort at the boundary between the image data of the first to 16th pixels and those of the 17th and subsequent pixels or generating any step between the right and left portions at the central portion.

Scheme of Processing by Image Processing Unit 705 of First Embodiment>

Figure 8:
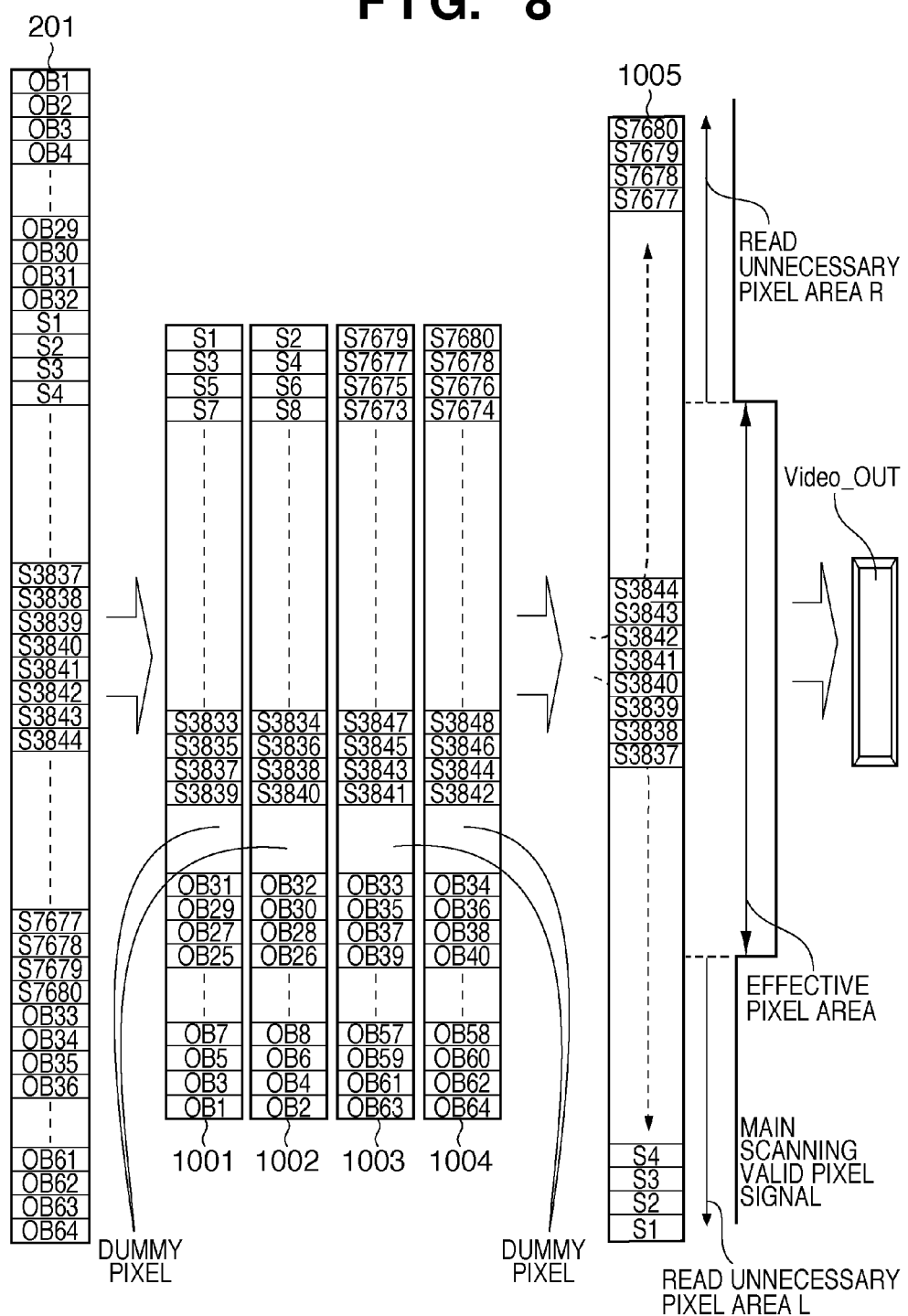
FIG. 8 is a view showing the output order of image signals when the CCD sensor according to the first embodiment is used.

FIG. 8 is a view showing an arrangement for performing rearrangement using the image processing unit 705 and rearrangement unit 803 according to this embodiment to output only an effective image area. The four output signals output as image signals from the PD unit 201 are output in an arrangement like that shown in FIG. 8. An output signal 1001 exhibits the arrangement of the image data of an output signal from OS1 in FIG. 2. Output signals 1002, 1003, and 1004 respectively correspond to OS2, OS3, and OS4 in FIG. 2. The PD unit 201 in this embodiment sends divided image data, starting from OB pixel data. Subsequently, the PD unit 201 sends dummy image areas containing no image data, and then sends image data with the image data at the central portion, at which the PD unit is divided, being sent first. Finally, the PD unit 201 sends image data on end portions of the read image data. The rearrangement unit 803 rearranges these four image data so as to arrange the image data from the central portion first and finally arrange the image data on the end portions of the PD unit 201, as indicated by the arrow shown above an output signal 1005 in FIG. 8. That is, the PD unit 201 outputs OB image data (shading pixel information) in addition to dummy image data before the image data of the read image area. In this embodiment, as shown in FIG. 8, since data at the central portion is output first, the step between the right and left portions can be corrected first. In addition, pixel data which need not be read is read at last, it is possible to perform image processing and output the resultant image without waiting for the output of the image data.

<Example of Output Control of Image Data in First Embodiment>

Figure 9:
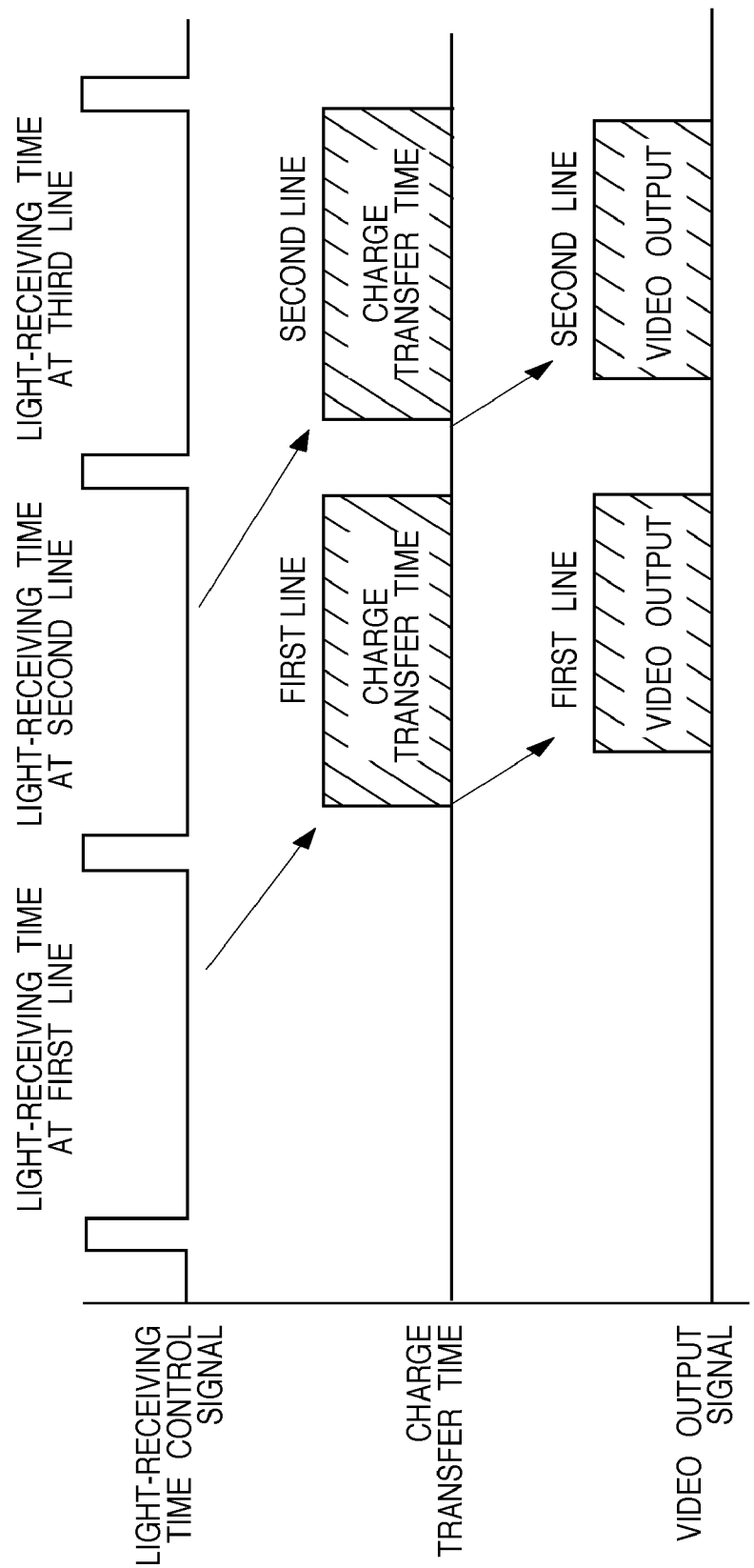
FIG. 9 is a chart showing an image data output control timing in the case of the CCD sensor according to the first embodiment.

An example of output control of image data by the CCD of this embodiment will be described with reference to FIG. 9. The CCD sensor of the embodiment starts "Video Output" immediately after the start of image transfer. The purpose of this operation is to output image data first from the central portion which is an effective image area. This indicates an increase in throughput from the instant the PD unit receives light to the instant the PD unit outputs an image signal.

(Example of Output Control in Using Auto Document Feeder)

Figure 10:
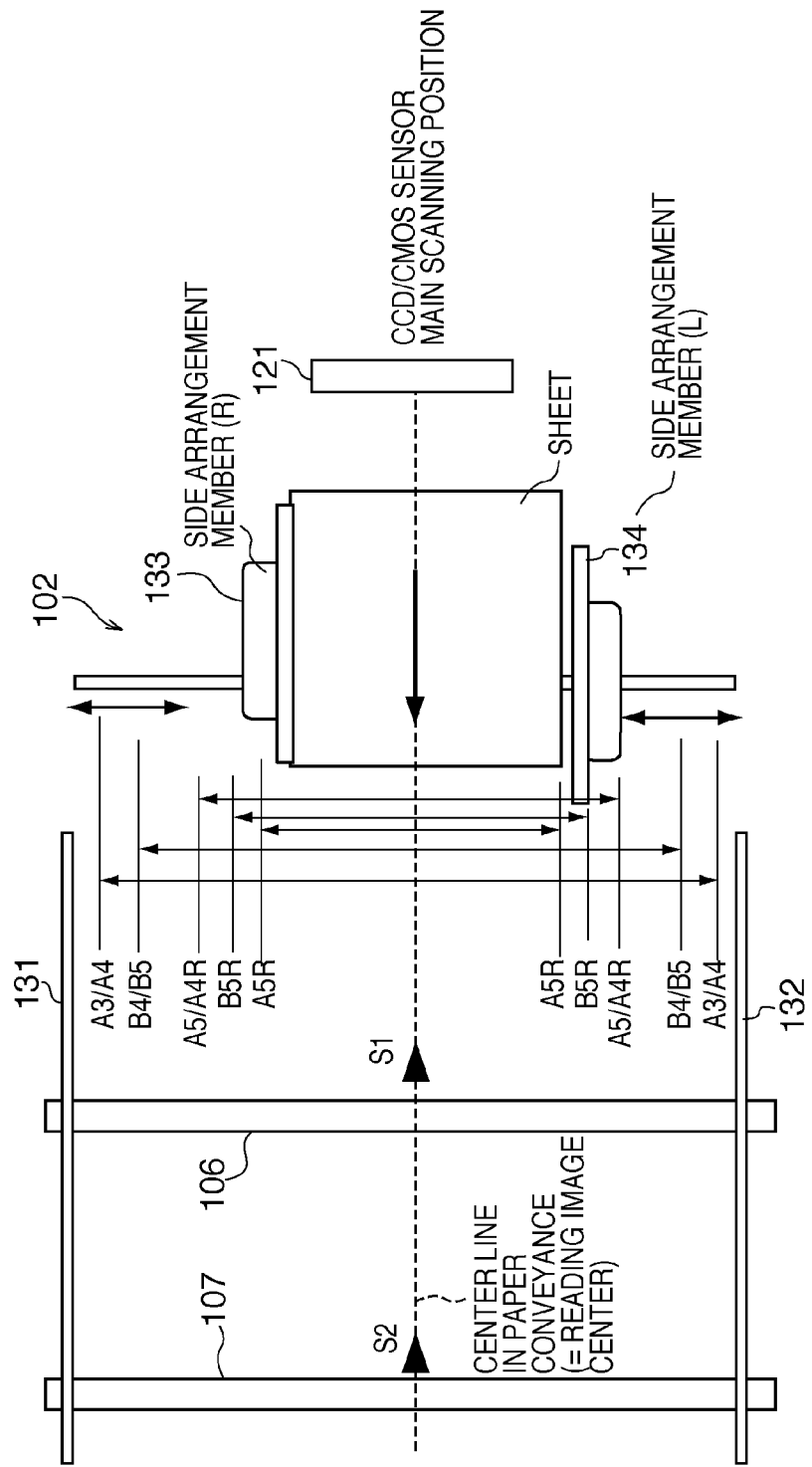
FIG. 10 is a view showing an example of an auto document feeder provided in the image reading apparatus according to this embodiment.
Figure 11:
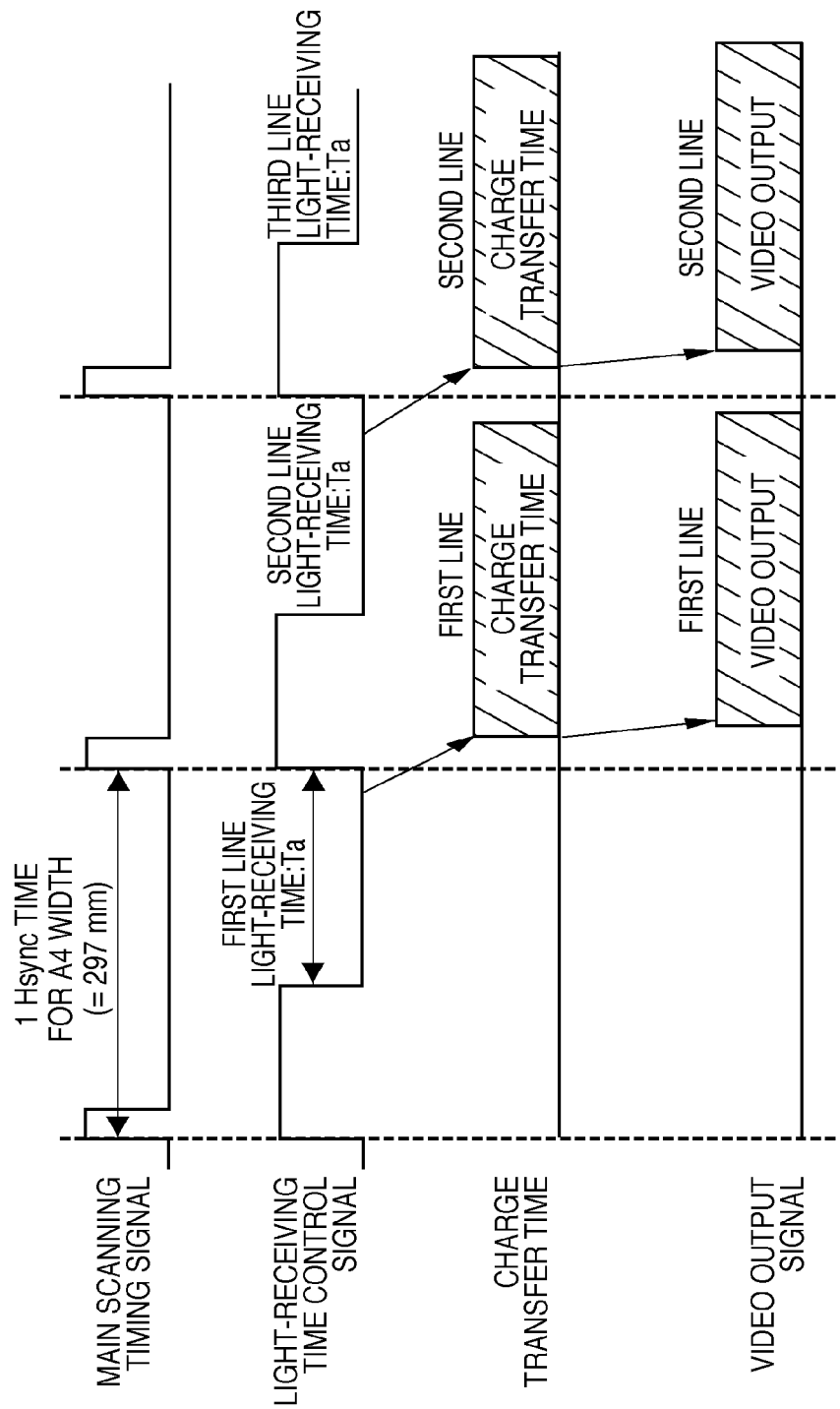
FIG. 11 is a chart showing an example of an image data output control timing when the auto document feeder in FIG. 10 and the CCD sensor according to the first embodiment are used, and a timing when a sheet having an A4 width (=297 mm) is set on a sheet stacking unit.
Figure 12:
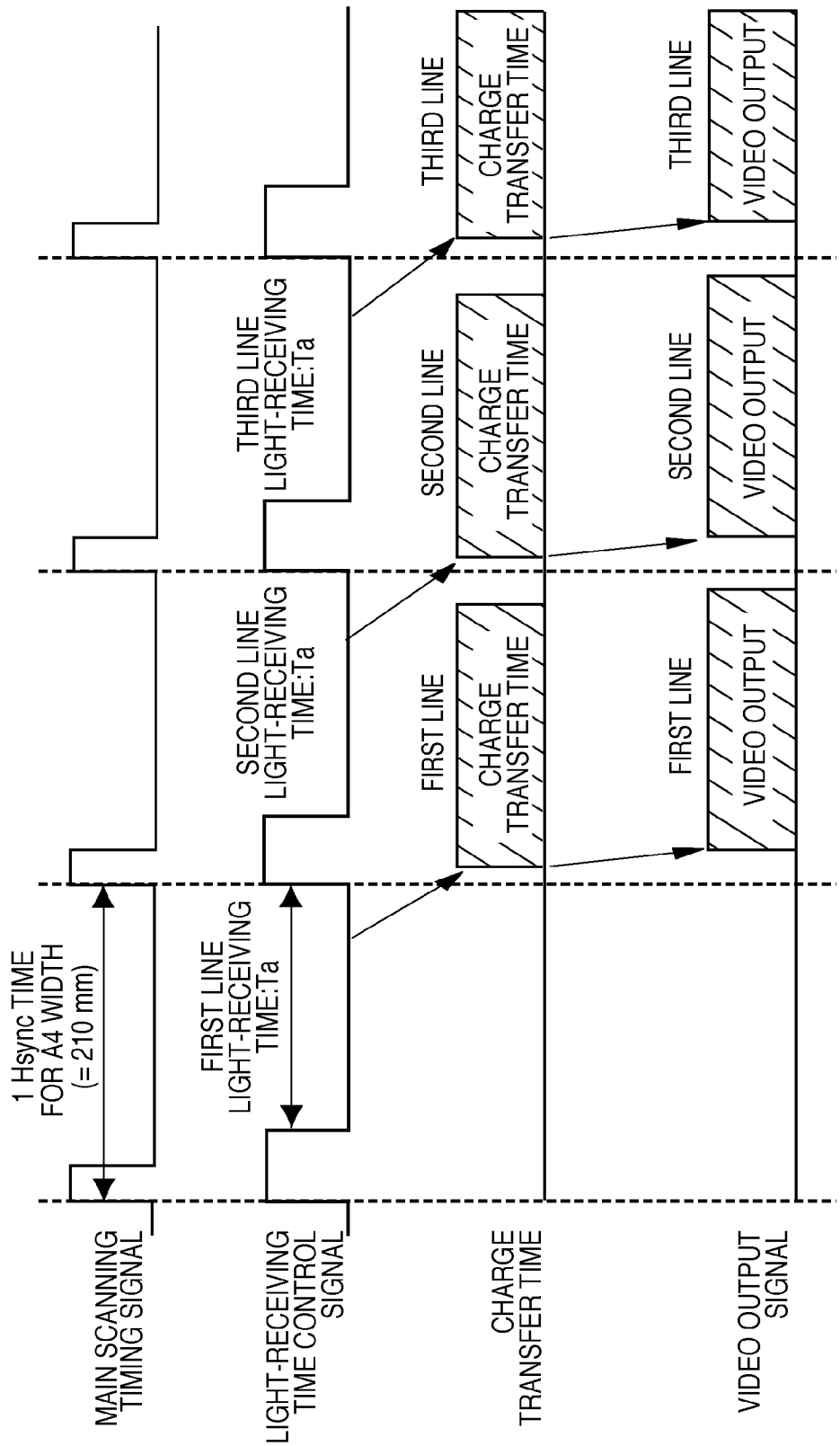
FIG. 12 is a chart showing an example of an image data output control timing when the auto document feeder in FIG. 10 and the CCD sensor according to the first embodiment are used, and a timing when a sheet having an A4R width (=210 mm) is set on the sheet stacking unit.

FIG. 10 is a plan view of the auto document feeder shown in FIG. 1. Side metal plates 131 and 132 support the rollers 106 and 107. A sheet stacking unit 102 includes side arrangement members 133 and 134. When the user stacks sheets on the sheet stacking unit 102, he/she corrects the slant of sheets by sliding the side arrangement members 133 and 134. In addition, the side arrangement members 133 and 134 include sheet size detection sensors (not shown) to determine the size of a sheet stacked on the sheet stacking unit 102 when the user slides the side arrangement members 133 and 134 to bring them into contact with end portions of the sheet. FIG. 10 shows the respective paper sizes for reference. The document center position defined by the side arrangement members 133 and 134 almost coincides with the position of the joint portion between the first and second half portions of the CCD (or CMOS) sensor (Photo electric conversion elements 121) of this embodiment at the central portion of the pixel portion in the main scanning direction. FIGS. 11 and 12 show the output timings of image signals when the CCD sensor of this embodiment with the auto document feeder in FIG. 10 is used. FIG. 11 shows the timing when a sheet having an A4 width (=297 mm) is stacked on the sheet stacking unit. FIG. 12 shows control in a case in which a sheet having an A4R width (=210 mm) is stacked on the sheet stacking unit. Referring to FIG. 11, a main scanning timing signal is determined by the charge transfer time of an image signal having an A4 width (=297 mm). A light receiving time Ta corresponding to one line is almost half the main scanning timing signal (=1 Hsync). In contrast to this, in the case shown in FIG. 12, since the sheet has the A4R width, it is possible to transfer only the charges corresponding to image data corresponding to A4R and discard the charges in the remaining pixels without reading them, based on the characteristics of the CCD sensor of this embodiment. This can shorten the 1 Hsync time as compared with the case in FIG. 11. Setting the light receiving time Ta to the same time as in FIG. 11 can change only the length of the image data without changing the amount of light which the PD of each pixel receives. Therefore, this scheme can optimize the time required to scan one sheet in accordance with the width of an image to be read. That is, it is possible to change the number of pixels to be read by the photoelectric conversion element in accordance with the width of a document stacked on the auto document feeder.

<Example of Image Reading Sequence According to First Embodiment>

Figure 13:
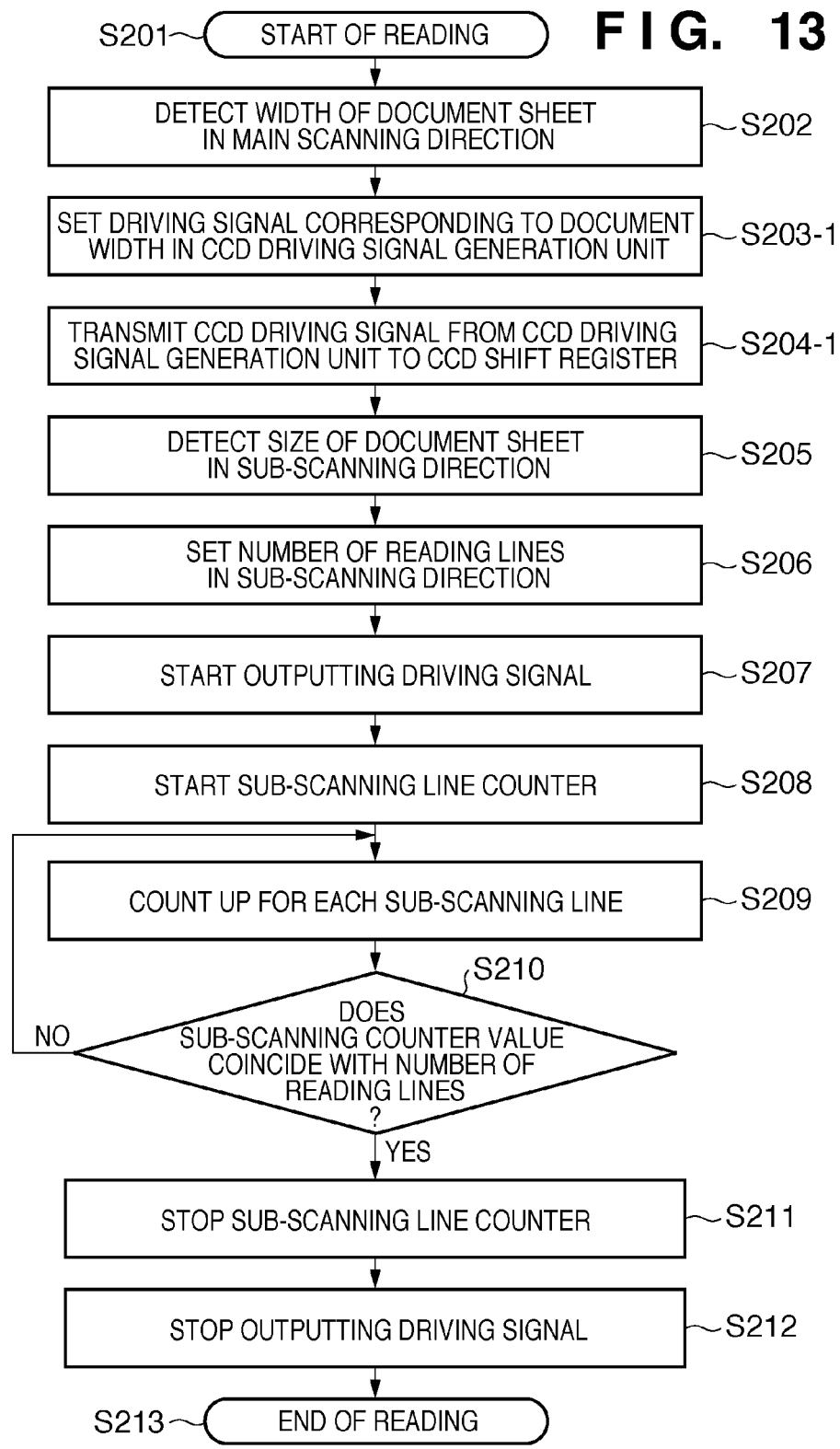
FIG. 13 is a flowchart showing an example of a sequence of reading one document page in the first embodiment.

FIG. 13 is a flowchart showing a sequence of reading an image corresponding to one document page in this embodiment. When starting reading operation (S201), the CPU detects the width of a document in the main scanning direction (S202). The width of the document in the main scanning direction is detected based on the positions of the size restricting members 133 and 134 in FIG. 10. The CPU performs setting in accordance with the width of the document in the main scanning direction determined in this case for the CCD driving signal generation unit 703-1 in the reading control IC 702-1 in FIG. 4 (S203-1). The CCD driving signal generation unit 703-1 then generates a CCD driving signal in accordance with the document width setting and transmits the signal to the CCD shift register unit (S204-1). The CPU then determines the size of the document in the sub-scanning direction by detecting the trailing edge portion of the document by using the sensor S1 while moving the document to the reading unit by using the auto document feeder (S205). The CPU sets the number of reading lines in the sub-scanning direction from the determined size of the document in the sub-scanning direction (S206). The CPU then moves the leading edge of the document sheet to the image reading position and causes a CCD/CMOS driving signal generation unit 703 of the CMOS sensor to start outputting a driving signal (S207). First of all, the CPU starts a sub-scanning counter (S208) and continues driving operation for reading while counting the number of sub-scanning lines until the counter value reaches the set number of sub-scanning lines (S209 and S210). When the counter value coincides with the number of sub-scanning lines, the CPU stops the sub-scanning line counter (S211) and stops outputting a driving signal for reading to the CMOS (S212), thereby completing reading operation corresponding to one document page.

Second Embodiment

The following is an example of the arrangement of the second embodiment and an example of the operation of the embodiment in a case in which the image reading apparatus of the present invention is implemented by a CMOS sensor. To avoid a redundant description, the arrangement and operation of the second embodiment which are the same as those of the first embodiment will not be described. For such information, refer to the arrangement and operation of the first embodiment.

<Example of Arrangement of CMOS Sensor of Second Embodiment>

Figure 14:
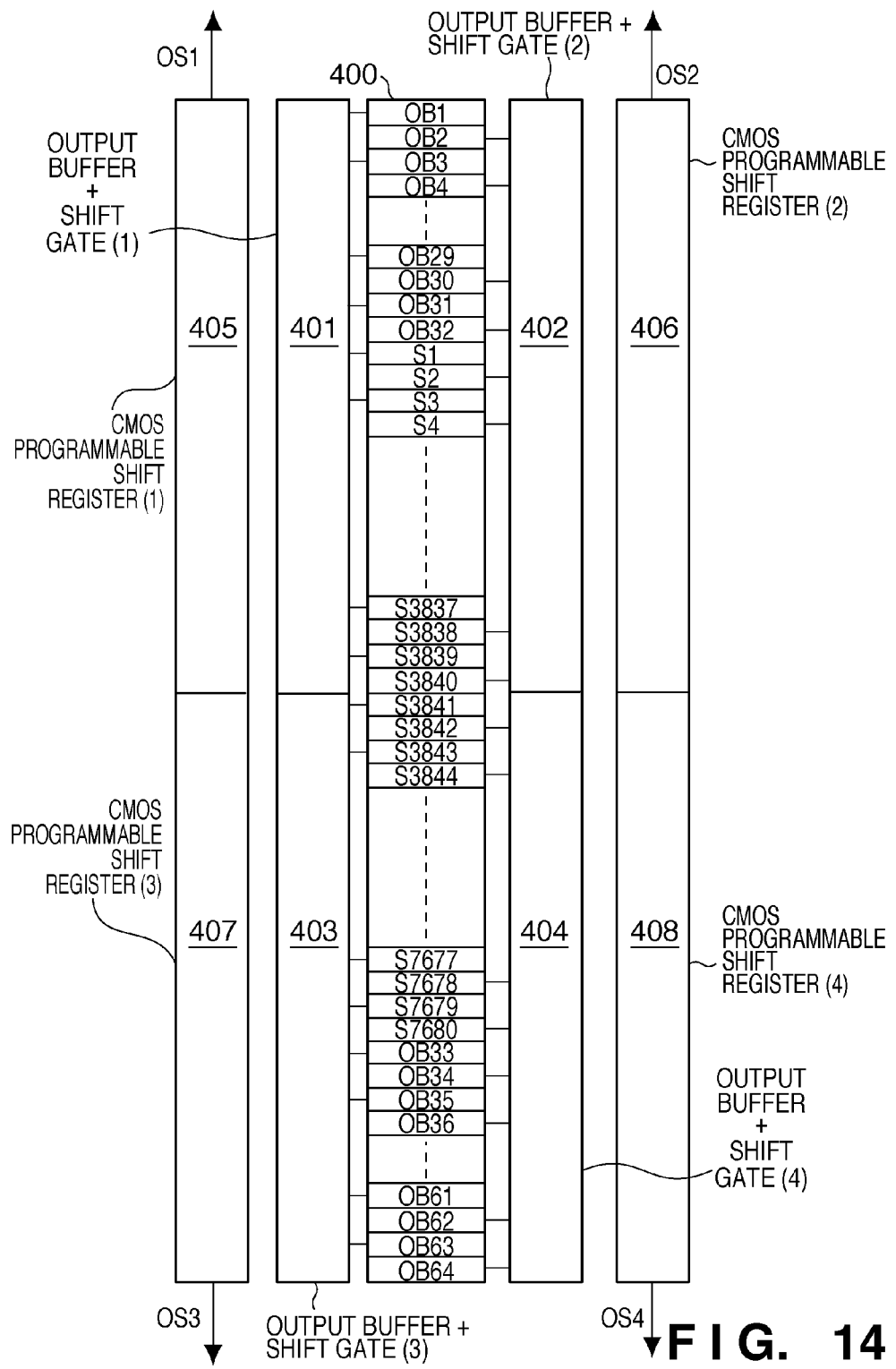
FIG. 14 is a view showing an example of a CMOS sensor according to the second embodiment.

FIG. 14 shows the second embodiment of the present invention, which is applied to a CMOS sensor. Like the PD unit 201 in FIG. 2, a PD unit 400 of the CMOS sensor has OB pixels provided on the two end portions, with light-receiving elements for reading an image being arranged inside the OB pixels in the main scanning direction. Output buffer+shift gates 401, 402, 403, and 404 convert charges in all the elements which is generated by the CMOS PD unit 400 into voltages, and then send the voltages to CMOS programmable shift registers 405, 406, 407, and 408. The CMOS programmable shift registers 405, 406, 407, and 408 are configured to randomly output read pixel data in accordance with a supplied program. The second embodiment performs control to sequentially output data from the pixels at the central portion to the pixels on the end portions so as to arrange the image data in the same order as that in FIG. 8 in the first embodiment after outputting OB pixel data first.

<Example of Flow of Image Signal in CMOS Sensor of Second Embodiment>

Figure 15:
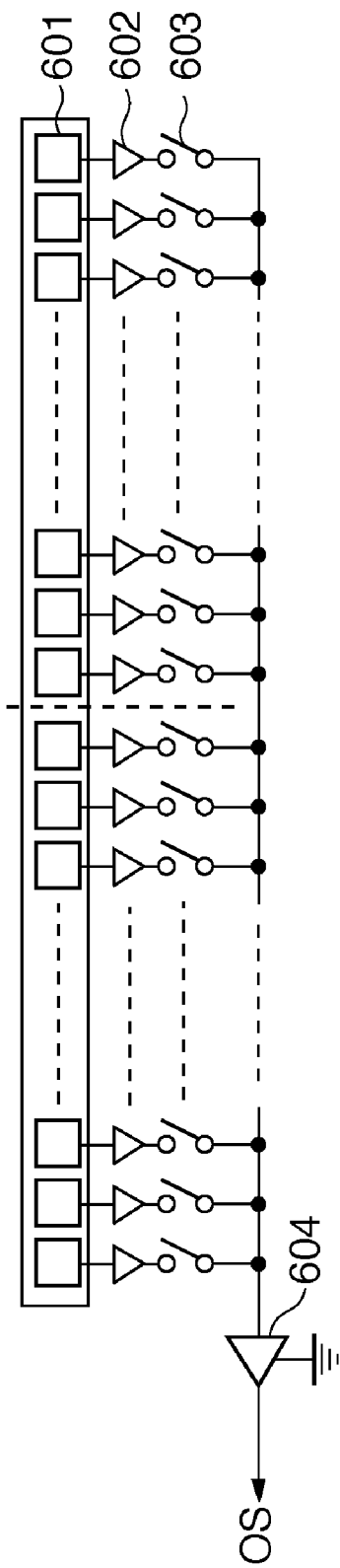
FIG. 15 is a simplified view of the structure of the CCD sensor according to the second embodiment.

FIG. 15 is a simplified view of the flow of data up to the output of an image in FIG. 14. An output buffer+shift gate unit 602 converts the charges generated in all the pixels by a CMOS PD unit 601 upon reception of light into voltages by using the respective buffers, and transfers the voltages to a CMOS programmable shift register 603. The CMOS programmable shift register 603 functions as a switch for reading data from arbitrary pixels. In this case, the switch is switched in accordance with a program to sequentially output data from desired pixels. Finally, the image is output via an output buffer 604. The CMOS sensor is controlled to output data from the OB pixels first by using this CMOS programmable shift register and then output image signals starting from signals from the central portion. This makes it possible to perform control similar to that of the CCD sensor of the first embodiment shown in FIG. 2.

<Example of Image Data Processing in CMOS Sensor of Second Embodiment>

Figure 16A:
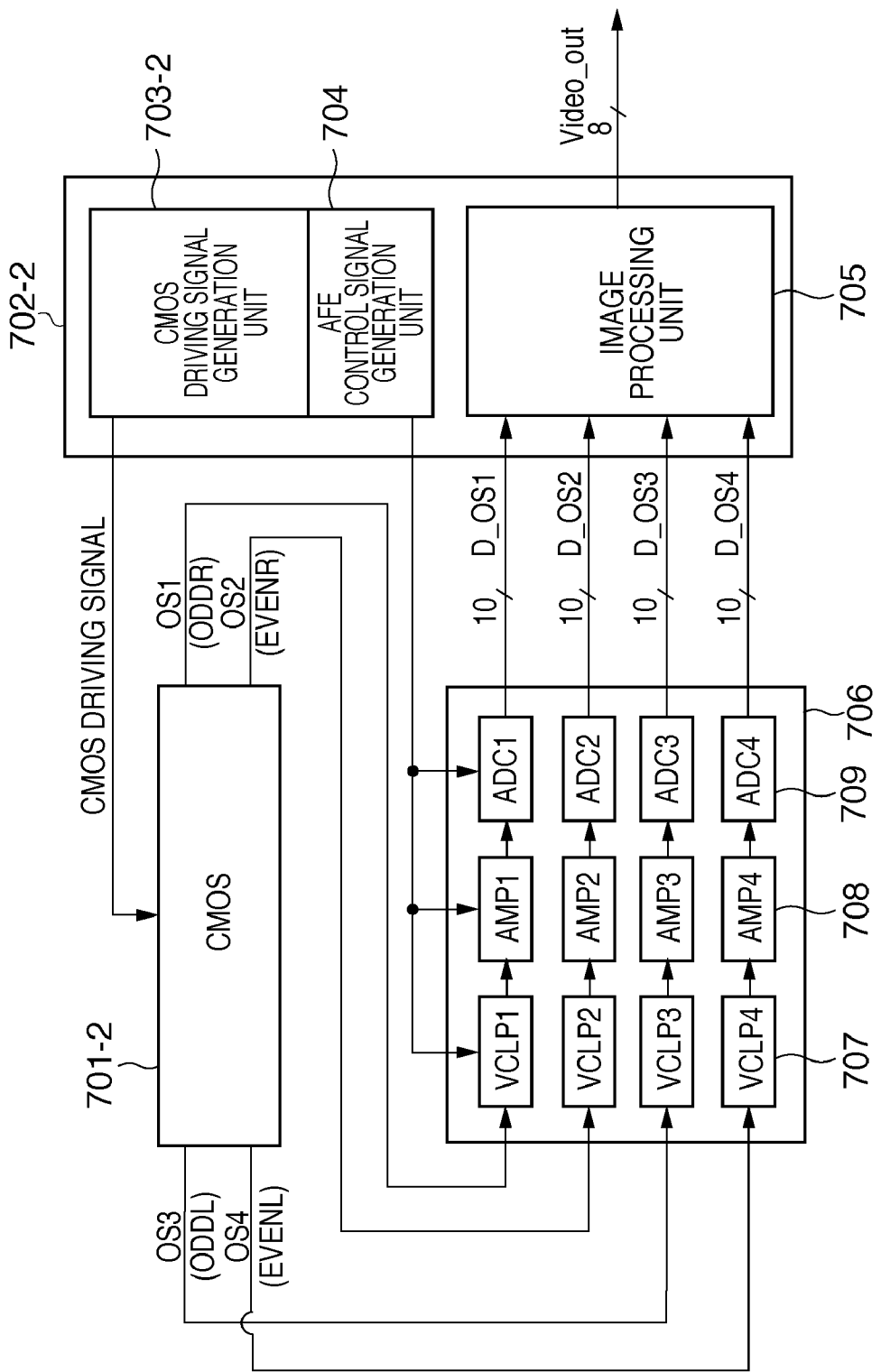
FIG. 16A is a block diagram showing an example of processing of the image signal output from the CMOS sensor according to the second embodiment.

FIG. 16A is a block diagram showing processing of image data output from the CMOS sensor according to this embodiment. A CMOS sensor 701-2 of the embodiment is driven by the CMOS driving signal generated by a CMOS driving signal generation unit 703-2 in a reading control IC 702-2 to output four output signals OS1, OS2, OS3, and OS4. The output signal OS1 represents the odd-numbered pixels (ODDR) on the right side of the sensor divided at the central portion in the main scanning direction. The output signal OS2 represents the even-numbered pixels (EVENR) on the right side of the sensor divided at the central portion in the main scanning direction. The output signal OS3 represents the odd-numbered pixels (ODDL) on the left side of the sensor divided at the central portion in the main scanning direction. The output signal OS4 represents the even-numbered pixels (EVENL) on the left side of the sensor divided at the central portion in the main scanning direction. An A/D conversion block 706 converts the four output signals OS1, OS2, OS3, and OS4 from analog signals to 10-bit digital signals. In the A/D conversion block 706, first of all, VCLPs 707 clamp the output voltages of the output signals OS1, OS2, OS3, and OS4 in accordance with the timing generated by an AFE (Analog Front End) control signal generation unit 704 in the reading control IC 702-2. AMPs 708 on the subsequent stage amplify the clamped voltages with predetermined gains designated by the AFE control signal generation unit 704, and send the resultant voltages to ADCs (Analog Digital Conversion circuits) 709 on the subsequent stage. The ADCs 709 output digital signals D_OS1, D_OS2, D_OS3, and D_OS4. An image processing unit 705 in the reading control IC 702-1 performs image processing of the output digital signals D_OS1, D_OS2, D_OS3, and D_OS4, and outputs the resultant signals as an 8-bit image signal Video Out.

<Example of Image Reading Sequence by Second Embodiment>

FIG. 16B is a flowchart showing a sequence of reading an image corresponding to one document page in this embodiment. The same reference numerals as in FIG. 13 in the first embodiment denote the same steps in FIG. 16B. When starting reading operation (S201), the CPU detects first the width of a document sheet in the main scanning direction (S202). The width of the document sheet in the main scanning direction is detected based on the positions of the size restricting members in FIG. 13. The CPU performs setting in accordance with the width of the document sheet determined in this case for the CMOS driving signal generation unit 703-2 in the reading control IC 702-1 in FIG. 16A (S203-2). The CMOS driving signal generation unit 703-2 then generates a CMOS driving signal in accordance with the document width setting and makes settings for read pixels in the main scanning direction with respect to the programmable register unit (S204-2). The CPU then determines the size of the document sheet in the sub-scanning direction by detecting the trailing edge of the document sheet by using the sensor S1 while moving the document sheet to the reading unit by using the auto document feeder (S205). The CPU sets the number of reading lines in the sub-scanning direction from the determined size of the document sheet in the sub-scanning direction (S206). The CPU then moves the leading edge of the document sheet to the image reading position and causes the CMOS driving signal generation unit 703-2 to start outputting a driving signal to the CMOS sensor (S207). First of all, the CPU starts a sub-scanning counter (S208) and continues read driving operation while counting the number of sub-scanning lines until the counter value reaches the set number of sub-scanning lines (S209 and S210). When the counter value coincides with the number of sub-scanning lines, the CPU stops the sub-scanning line counter (S211) and stops outputting a driving for reading signal to the CMOS (S212), thereby completing reading operation corresponding to one document page.

<Example of Arrangement of CMOS Programmable Shift Register>

Figure 17:
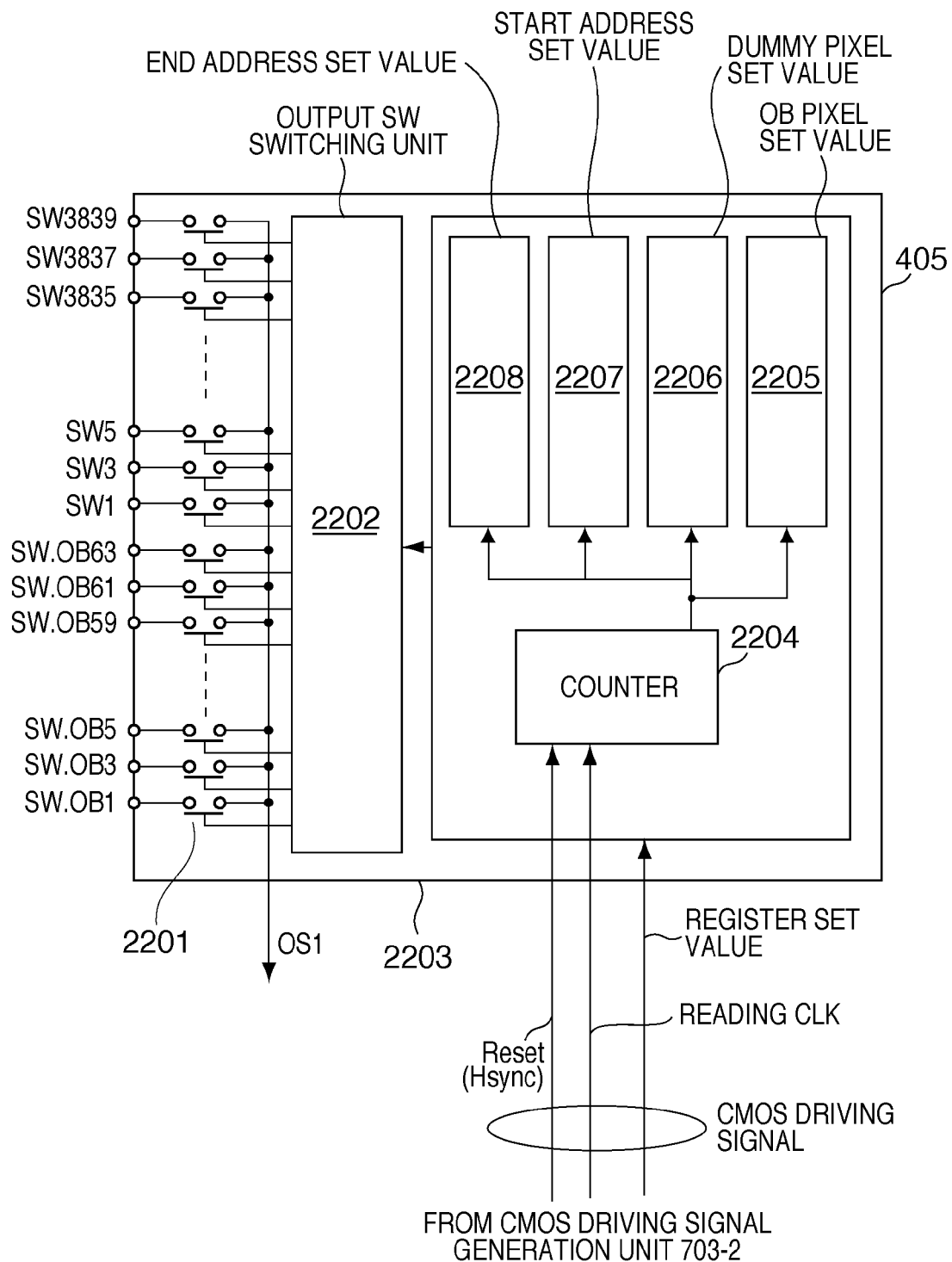
FIG. 17 is a view showing an example of the arrangement of the internal circuit of a CMOS programmable shift register in the CMOS sensor in FIG. 14.

FIG. 17 is a view showing the internal circuit of the CMOS programmable shift register 405 in the CMOS sensor in FIG. 14. An output SW 2201 is a switch for transmitting the voltage generated by each element in the output buffer+shift gate in FIG. 14 to the output signal OS1. An output SW switching unit 2202 performs control to turn on only one of the SWs of the output SW 2201. A programmable register unit 2203 outputs a command to turn on a specific one of the SWs of the output SW switching unit 2202. The programmable register unit 2203 receives, from the CMOS driving signal generation unit, a read CLK for main scanning reading, an Hsync signal (used as "Reset") indicating a one-line interval, and register setting values for deciding specific data pixels from which data are to be read and a specific data reading order. The register set values include an OB pixel set value 2205 for deciding the number of reading pixels of the OB pixels. The register set values also include a dummy pixel set value 2206 for setting the number of dummy pixels to be inserted between the OB pixels and the effective pixels, a start address set value 2207 for setting a specific address from which the effective pixels are to be read, and an end address set value 2208 for setting a specific address up to which pixel data is read. A memory (not shown) in the programmable register unit holds the register set values. The CPU controls the output SW switching unit 2202 by automatically shifting the address in accordance with the counter value of a counter 2204 from the start address set value 2207 to the end address set value 2208. For example, if the start address set value is "3839" and the end address set value is "999", the CPU instructs the output SW switching unit 2202 to turn on SW 3839 during a reading period corresponding to the number of effective pixels. When the counter 2204 is incremented by one, the CPU shifts toward the end address set value in accordance with the CLK counter in such a manner that the CPU turns on SW 3837 and then turns on SW 3835. When turning on SW 999, the CPU terminates the reading processing and turns off all the SWs.

<Example of Operation Sequence of CMOS Programmable Shift Register>

Figure 18:
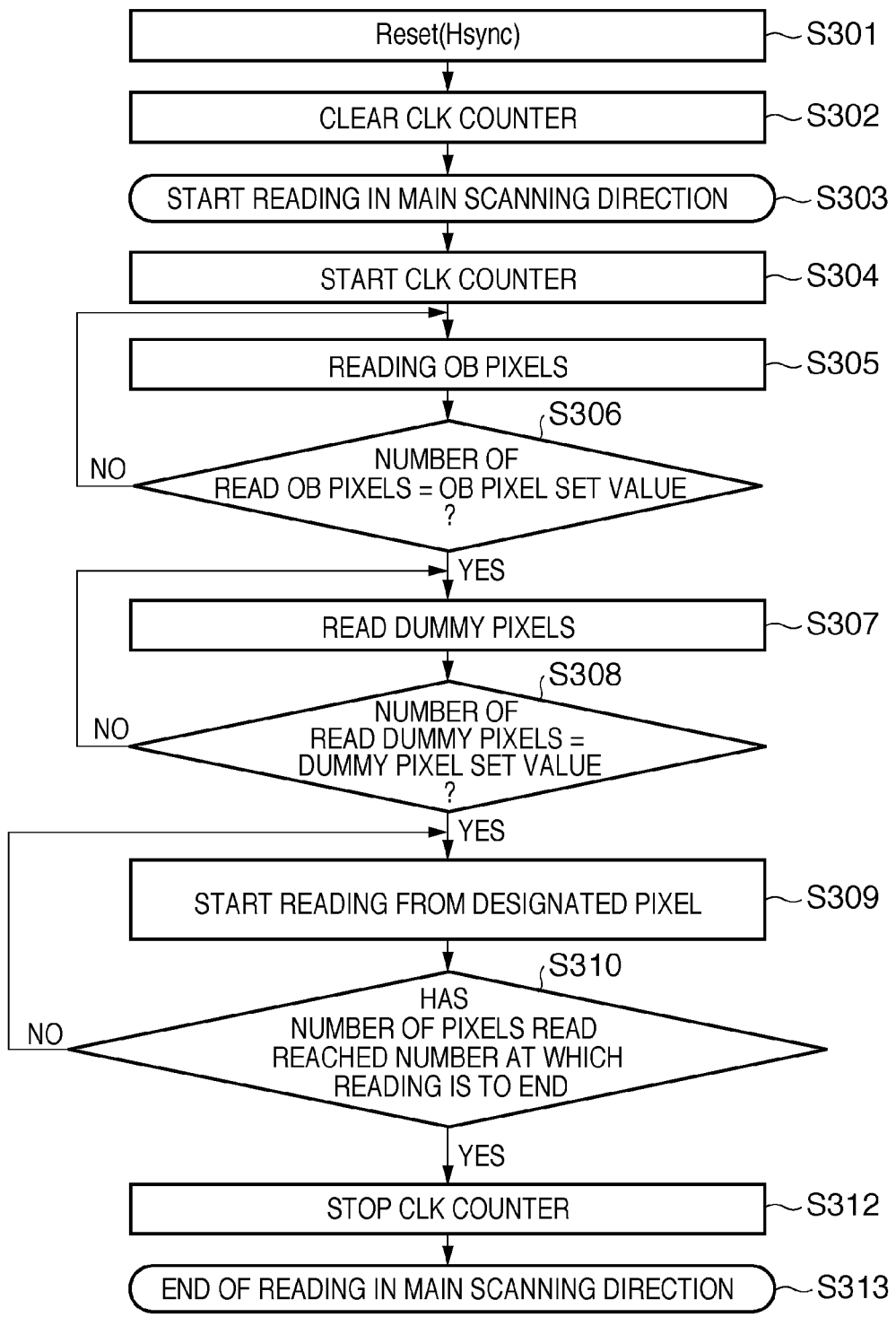
FIG. 18 is a flowchart showing an example of an operation sequence in the CMOS programmable shift register in the CMOS sensor in FIG. 17.
Figure 20:
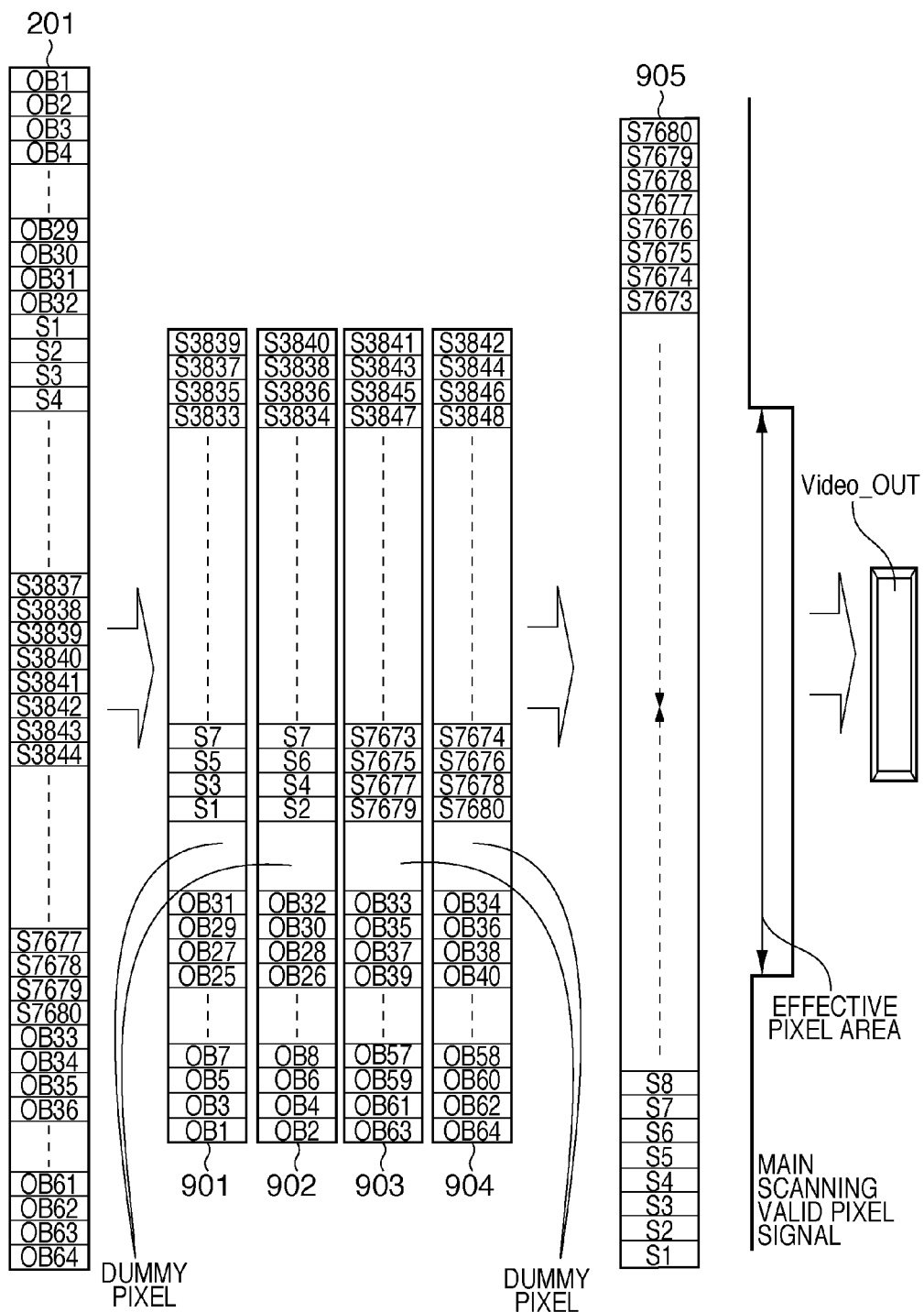
FIG. 20 is a view showing the output order of image signals in the conventional CCD sensor.
Figure 21:
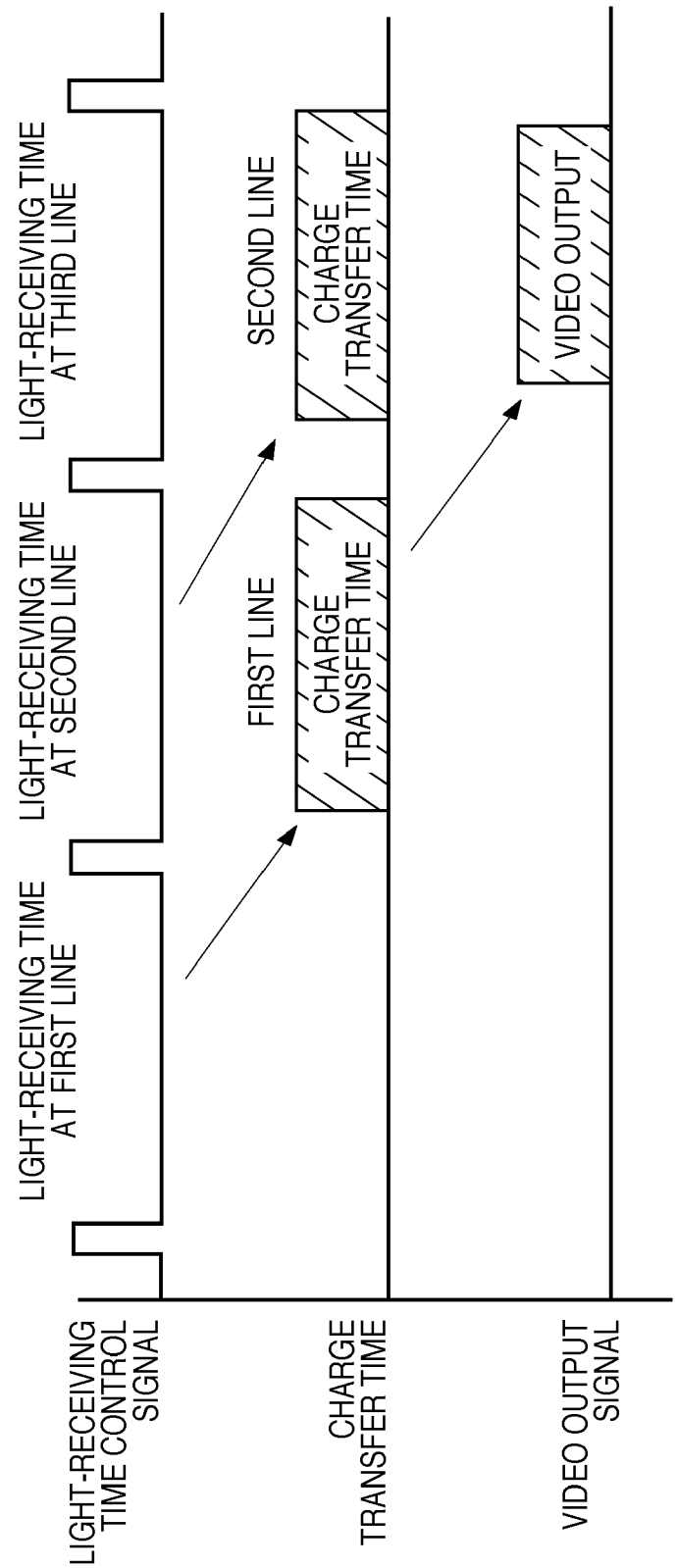
FIG. 21 is a view showing an image data output control timing in the case of the conventional CCD sensor.
Figure 22:
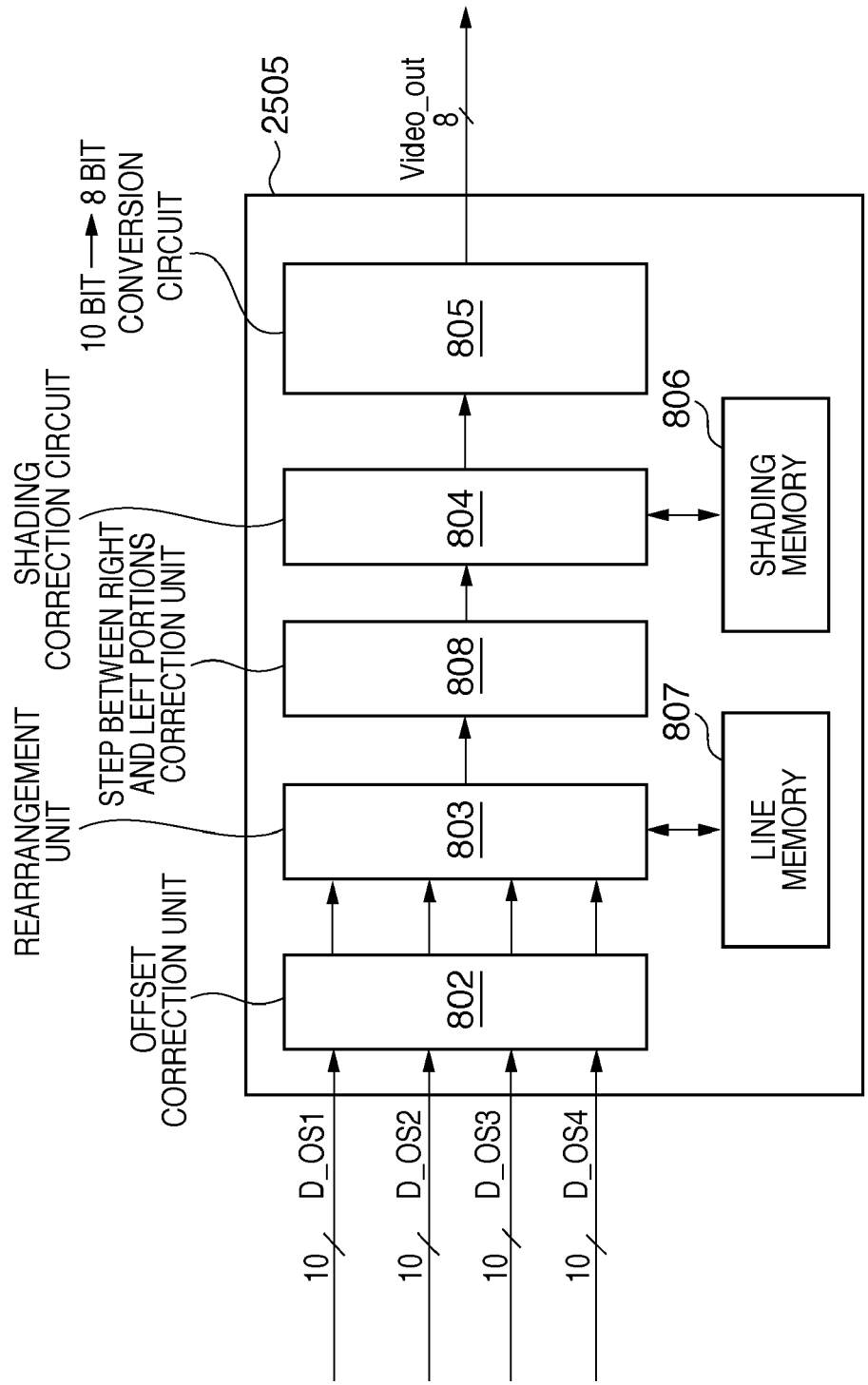
FIG. 22 is a view showing the internal blocks of an image processing unit 2505 using the conventional CCD sensor.

FIG. 18 represents the operation in FIG. 17 in the form of a flowchart. Upon receiving a Reset signal as an Hsync signal (S301), the CPU clears the counter of the programmable register unit (S302) to start reading data from pixels in the main scanning direction (S303). When the clock counter starts (S304), the CPU starts reading data from OB pixels first (S305). The CPU reads data from OB pixels while comparing the number of reading OB pixels set in the programmable register unit with the counter value to determine whether they coincide with each other (S306). If the counter value coincides with the number of reading OB pixels, the process shifts to the next dummy pixel reading operation (S307). To output data from dummy pixels is to insert ineffective signals corresponding to a predetermined number of clocks between OB pixels and effective pixels without turning on any output SWs. The CPU performs this operation while comparing the number of dummy pixels set in the programmable register unit with the counter value to determine whether they coincide with each other (S308). If the counter value coincides with the number of dummy pixels, the process shifts to pixel reading operation from the next designated pixel (S309). In step S309, the CPU starts reading operation from the pixel designated by the start address set value set in the programmable register unit. The CPU repeatedly outputs data from effective pixels while switching the output SWs and shifting effective pixels in accordance with clocks up to the end pixel (S310). When the end pixel is reached, the CPU stops the CLK counter (S312), thereby terminating the reading processing corresponding to one line in the main scanning direction (S313).

Note that the present invention can be applied to a system constituted by a plurality of devices or an apparatus comprising a single device. In addition, the present invention can be implemented by directly or remotely supplying, to the system or apparatus, software programs which implement the functions of the above embodiments. The present invention is implemented by causing the computer included in the system or the like to read out and execute the supplied program codes.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-164108, filed on Jul. 10, 2009, which is hereby incorporated by reference herein in its entirety.

What is claimed is:

1. An image reading apparatus comprising:
a photoelectric conversion element in which a plurality of pixel sensors receiving reflected light from a document are arranged in a main scanning direction; and
a transfer circuit configured to output image information output from said photoelectric conversion element to an output unit, said transfer circuit having transfer channels which transfer the image information output from a first half portion and a second half portion of said photoelectric conversion element in the main scanning direction, respectively,
wherein said transfer circuit outputs, to the output unit, a pixel adjacent to a joint portion between the first half portion and the second half portion of said photoelectric conversion element in the main scanning direction as a start pixel.

2. The apparatus according to claim 1, wherein each of the first and second half portions of said photoelectric conversion element in the main scanning direction includes a light-shielded pixel area in which the reflected light from a document is not received, and
said transfer circuit outputs, to the output unit, light-shielded pixel information from the light-shielded pixel area before outputting the image information.

3. The apparatus according to claim 1, further comprising an auto document feeder which automatically conveys a document to an image reading position,
wherein a document center position in the main scanning direction of said auto document feeder is determined at the substantially same position of the joint portion between the first half portion and the second half portion of said photoelectric conversion element in the main scanning direction.

4. The apparatus according to claim 3, wherein a number of pixels read by said photoelectric conversion element is varied in accordance with a width of a document stacked on said auto document feeder.

5. The apparatus according to claim 1, wherein said photoelectric conversion element comprises one of a CCD sensor and a CMOS sensor.

* * * * *